Figure 2C:
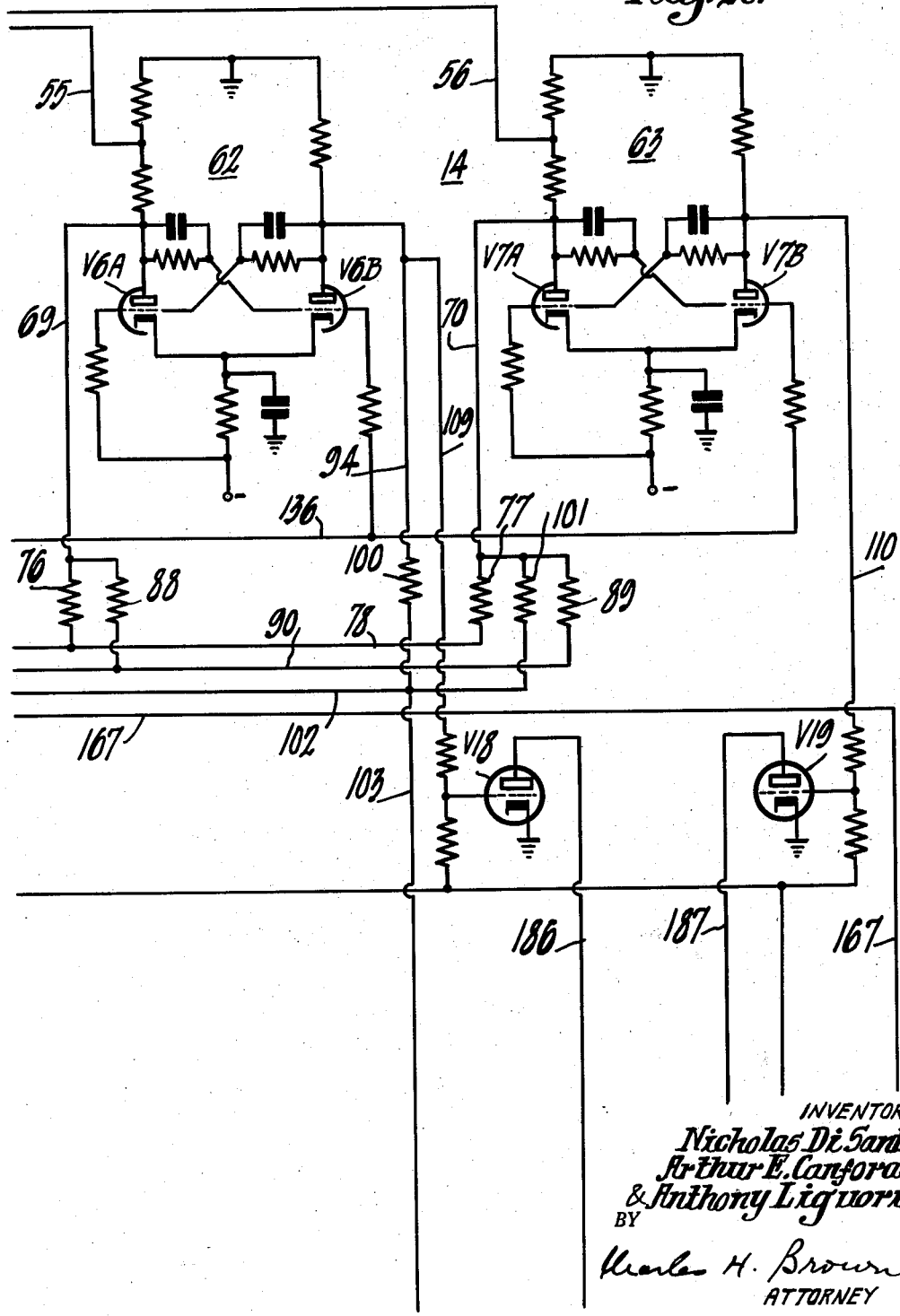

Jan. 13, 1959 N. DI SANTI ET AL 2,868,875
SIGNAL DISTORTION MEASURING SYSTEM
Filed May 25, 1956 7 Sheets-Sheet 1
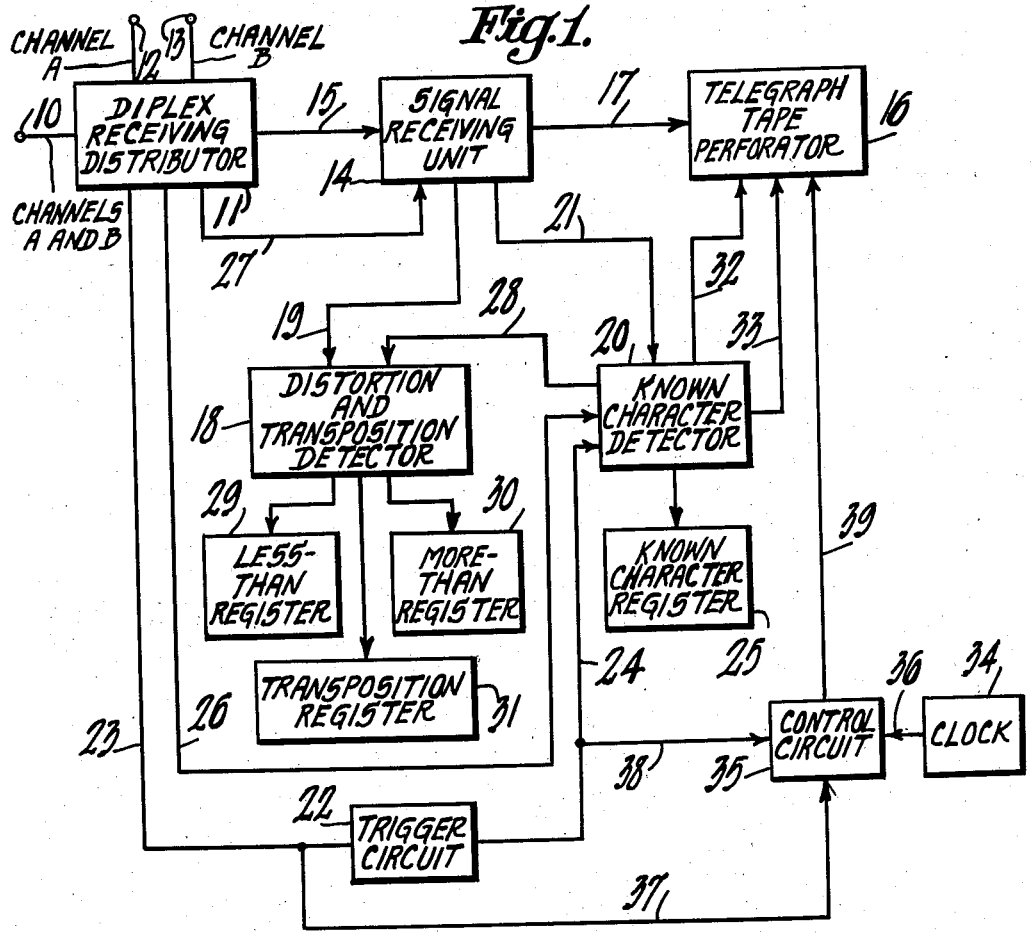
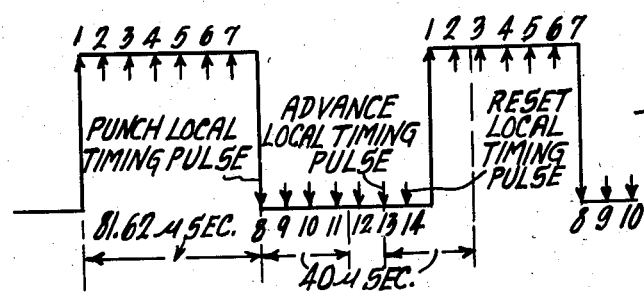
KEY TO FIG. 2.
| FIG.2a. | FIG.2b. | FIG.2c. |
| --- | --- | --- |
| FIG.2d. | FIG.2e. | FIG.2f. |
INVENTORS
Nicholas Di Santi
Arthur E. Canfora
& Anthony Liguori
BY
Charles H. Brown
ATTORNEY

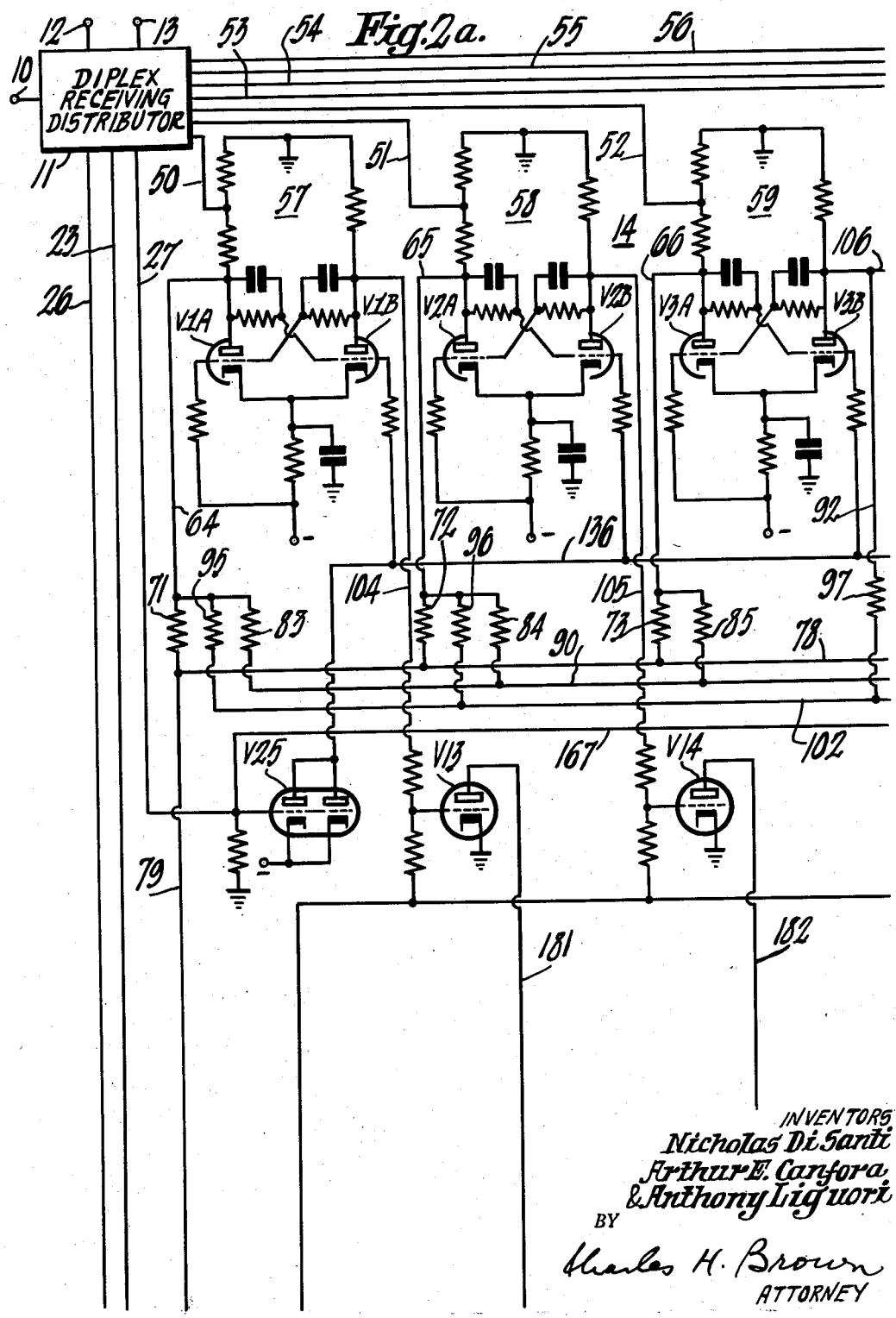

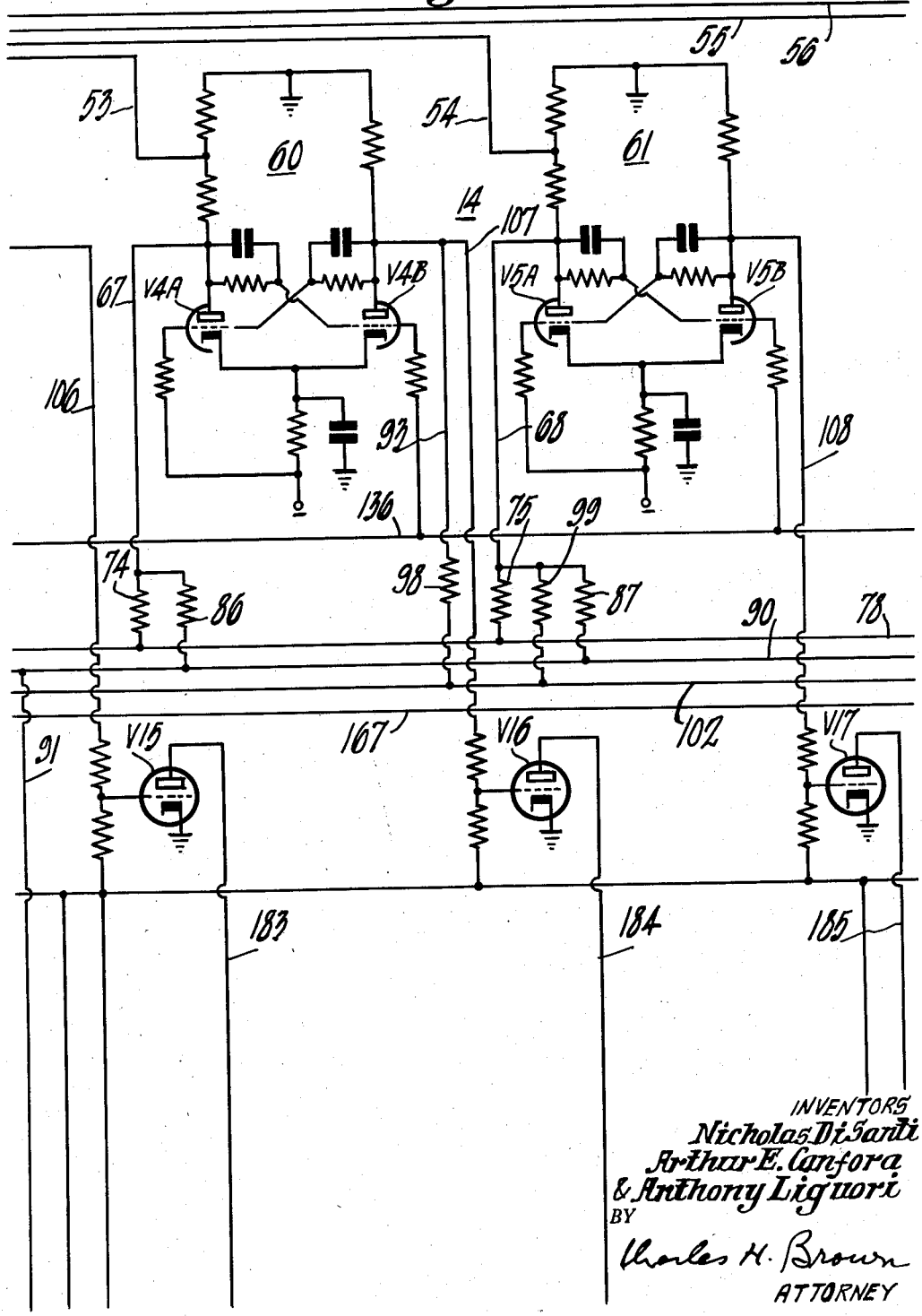

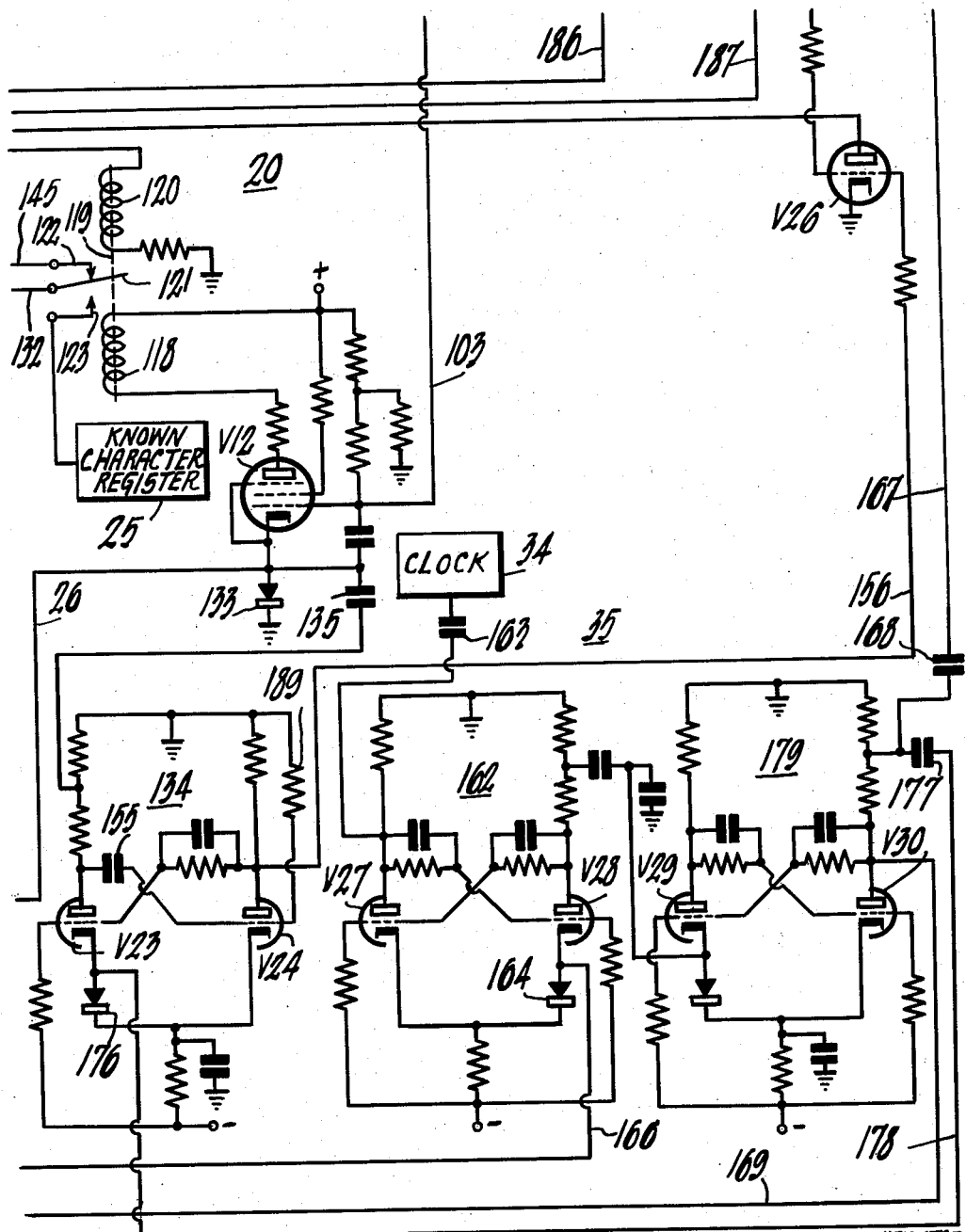

United States Patent Office 2,868,875
Patented Jan. 13, 1959

2,868,875

SIGNAL DISTORTION MEASURING SYSTEM

Nicholas Di Santi and Arthur E. Canfora, Brooklyn, and Anthony Liguori, Huntington Station, N. Y., assignors to Radio Corporation of America, a corporation of Delaware Application May 25, 1956, Serial No. 587,396

29 Claims. (Cl. 178—69)

This invention relates to systems for measuring the distortion of a signal received over the transmission path of a communication system. It particularly concerns a system for measuring and recording on a permanent record the distortion of a signal received over the transmission path of a telegraph communication system using a protected telegraph code.

Generally, telegraph communication systems make use of a fixed-length telegraph code. One type of fixed-length telegraph code commonly used in telegraph communication systems at the present time is known in the art as a protected telegraph code. A protected telegraph code requires the transmission of a predetermined number of signal elements for each character of the code, a fixed number of the signal elements in each character of the code being marking elements. For example, in the seven-unit protected telegraph code, each character of the code includes three marking elements and four spacing elements. The reception of a character containing more or less than the fixed number of marking elements indicates that a false or distorted character has been received. By using a protected telegraph code and by including means at a telegraph receiving station for determining the number of marking elements in each character in a signal received thereat, characters containing more or less than the fixed number of marking elements can be readily detected.

Although a character of a protected telegraph code received at the telegraph receiving station of a telegraph communication system contains the fixed number of marking elements included in each character of the code, the character may still be distorted. During the transmission of the character, particularly over a transmission path including a radio frequency transmission system, one or more of the marking elements may be deleted by atmospheric conditions and one or more of the spacing elements may be filled in by noise. The resulting character may still include the same ratio of marking elements to spacing elements as it contained originally. A character received at the telegraph receiving station distorted in this manner is a legitimate character of the protected telegraph code, inasmuch as the character still includes the fixed number of marking elements. However, the character received, as compared to the original character transmitted, is distorted. This type of distortion is referred to hereinafter as "transposition" to distinguish it from the type of distortion in which a character is received containing more or less than the fixed number of marking elements.

Various types of distortion can, therefore, occur in the transmission of a character over the transmission path of a telegraph communication system using a protected telegraph code. Known arrangements can be used at the receiving station of a telegraph communication system to detect distorted characters of the type described above. Such arrangements operate to prevent the printing of a distorted character by the telegraph printing equipment at the telegraph receiving station. A symbol may be printed in place of the distorted character, or correction circuits may be placed in operation to request a repeat transmission by the remotely located telegraph transmitting station of the character which was received distorted.

It is desirable that a measuring system be provided that can analyze the make-up of a signal received over the transmission path of a telegraph communication system using a protected code. It is particularly important that a measuring system be provided which counts on an individual basis each of the various types of distorted characters detected by the operation of the system, recording on a permanent record the arrangement of signal elements included in each of the distorted characters. The data obtained by the operation of such a measuring system can be used as a basis for determining the reason for the various types of distortion, leading to improvements in the design and operation of the equipment of the telegraph communication system. Regular testing and measuring procedures can be followed to ensure that a telegraph communication system using a protected telegraph code is operating properly and to discover ways in which the operation of the telegraph communication system can be improved.

It is, therefore, an object of this invention to provide a novel system for measuring the distortion of a signal received over the transmission path of a telegraph communication system using a protected telegraph code.

It is a further object of this invention to provide a novel system for counting the various types of distorted characters and for recording on a permanent record the arrangement of signal elements included in each of the distorted characters contained in a signal received over the transmission path of a telegraph communication system using a protected telegraph code.

Briefly, the measuring system of the invention is used in conjunction with the signal distributing equipment located at the telegraph receiving station. In the conventional operation of a telegraph communication system, a plurality of different signals are transmitted over a single transmission path in multiplex fashion, the signals being assigned to separate channels. The signal distributing equipment at the telegraph receiving station of the telegraph communication system operates to distribute the different signals to separate utilization circuits. In normal operation, each of the signals contains regular traffic communicated between the telegraph transmitting station and the telegraph receving station. In one application of the measuring system of the invention, the telegraph transmitting station of the telegraph communication system is operated to discontinue the transmission of a signal containing regular traffic over one of the channels. The telegraph transmitting station is thereafter operated to transmit a testing signal containing a predetermined character of the protected telegraph code over the channel of operation from which a signal containing regular traffic has been removed. The character used for testing purposes is transmitted repetitiously over that channel. The signal distributing equipment at the telegraph receiving station is operated to feed the character repetitiously transmitted over the channel to a signal receiving unit included in the measuring system of the invention. As each character is received by the signal receiving unit, it is fed through the unit to a telegraph recording or storage device of conventional design, for example, a tape perforator. The signal receiving unit is also electrically connected to a known character detector and to a distortion and transposition detector.

When one of the characters contained in the testing signal which has not been distorted during its passage over the transmission path of the telegraph communication system is received by the signal receiving unit, the signal receiving unit is operated to apply a control signal to the known character detector. The known character detector is, in turn, operated in response to the control signal and to a triggering signal supplied by the signal distributing equipment to bring about the operation of a counting mechanism in a known character register, recording the reception of the legitimate character and completing the operation of the measuring system in response to that particular character. Upon the reception by the signal receiving unit of a character which has been distorted in one of the ways outlined above during its passage over the transmission path, the signal receiving unit operates to feed a control signal to the distortion and transposition detector. The nature of the control signal depends on the type of distorted character received by the signal receiving unit. The signal receiving unit also operates to forward a second control signal to the known character detector which causes the known character detector to be held in a non-operating condition. The triggering signal supplied by the signal distributing equipment is fed through the known character detector to the distortion and transposition detector and to the telegraph recording device. The distortion and transposition detector operates in response to the control signal fed thereto from the signal receiving unit and to the triggering signal to bring about the operation of a counting mechanism in either a less-than register, more-than register or transposition register. The less-than register records the characters containing less than the fixed number of marking elements, while the more-than register records the characters containing more than the fixed number of marking elements. The telegraph recording device operates simultaneously in response to the triggering signal to record on a tape or similar type of storage device the arrangement of signal elements included in the distorted character, the distorted character having been fed thereto from the signal receiving unit.

By counting each of the legitimate characters and by separately counting each type of distorted character included in the testing signal fed to the measuring system during a testing period, the testing signal containing a repeated predetermined character of the protected telegraph code used, the measuring system of the invention can determine whether or not a telegraph communication system using a protected telegraph code is operating properly. The tape or similar storage device upon which the arrangement of signal elements included in each distorted character has been recorded can be studied in an effort to discover the cause of the various types of distortion.

In a further application of the invention, with minor modifications, regular traffic sent over a channel can be fed to the measuring system of the invention at the same time it is fed to a telegraph utilization circuit. While the system cannot operate to detect and record characters distorted due to transposition, it will detect and record distorted characters containing more or less than the fixed number of marking elements. By the operation of the registers and of the telegraph recording device, a permanent record is produced which can be used to check the satisfactory operation of the system.

Figure 2D:
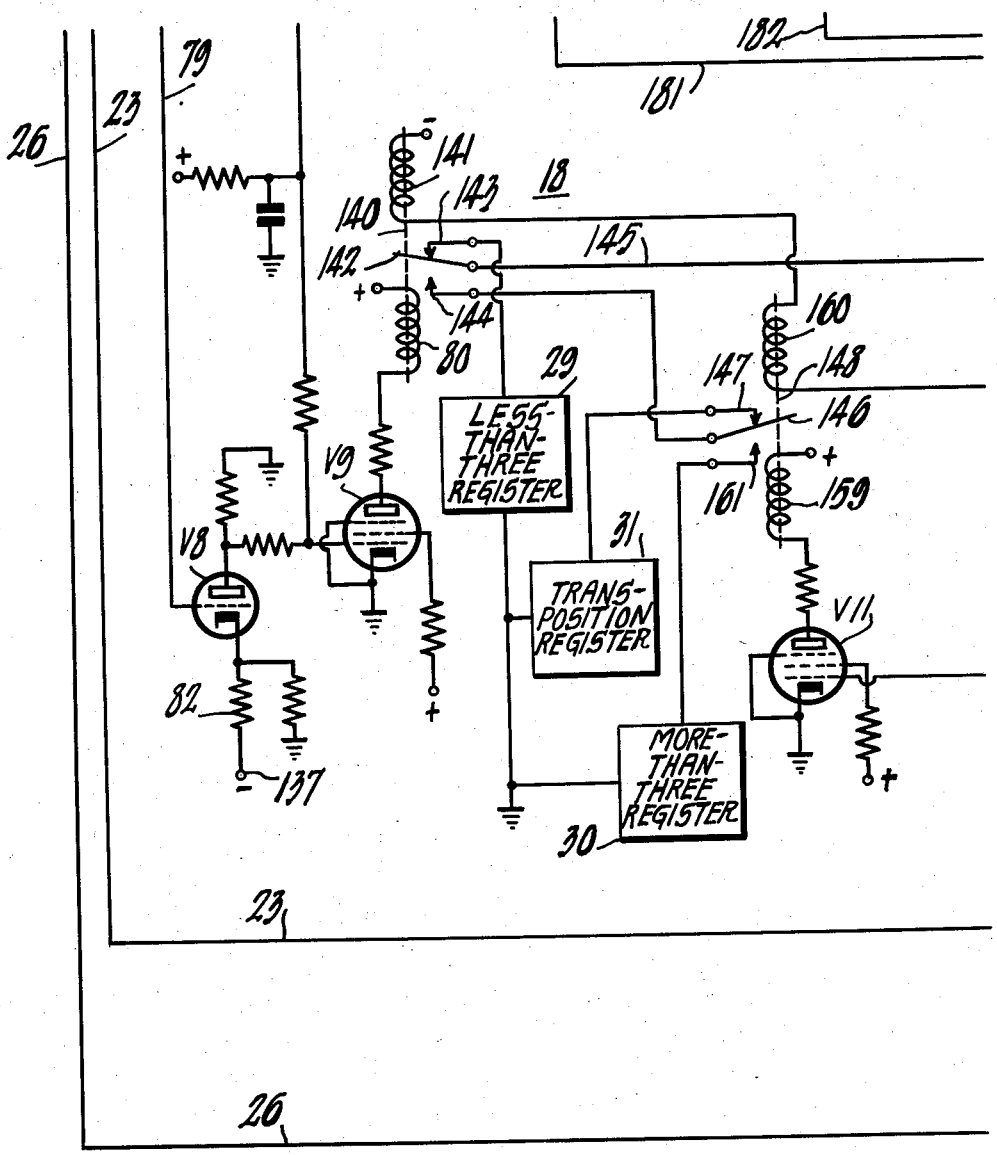
Figure 2E:
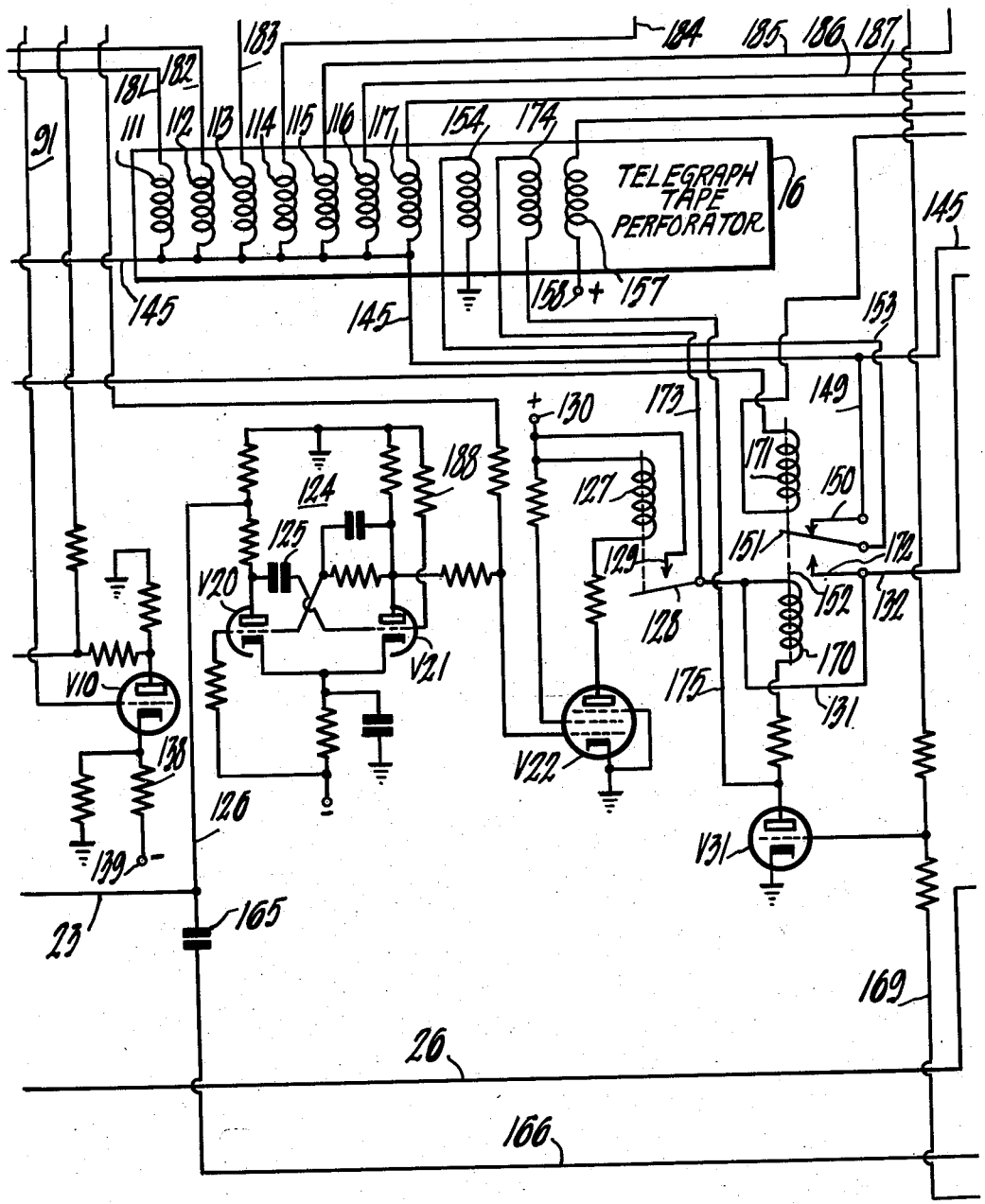

A more complete description of the invention will be given in connection with the accompanying drawing, in which:

Fig. 1 is a functional block diagram of a measuring system according to the invention;

Figs. 2a, 2b, 2c, 2d, 2e and 2f, taken together, show a schematic diagram of a circuit arrangement functioning according to the invention as outlined by the block diagram of Fig. 1; and Fig. 3 is a timing diagram used in explaining the operation of the circuit arrangement shown in Fig. 2.

Referring to Fig. 1, there is shown a functional block diagram of a measuring system constructed according to the invention. A multiplex signal received over the transmission path of a telegraph communication system using a protected telegraph code is fed to an input terminal 10. The multiplex signal is fed from the input terminal 10 to a diplex receiving distributor 11. The distributor 11 operates to distribute the different signals included in the multiplex signal to separate utilization circuits. In the arrangement shown in Fig. 1, the multiplex signal received at terminal 10 is assumed to include two channels A and B. In normal operation, signals containing regular traffic are sent over the channels A and B of the multiplex signal. The distributor 11 is operated in such a manner that the signal transmitted over channel A is fed to a utilization circuit by means of output terminal 12. The signal transmitted over channel B is fed to a second utilization circuit by means of an output terminal 13. The distributor 11 also supplies various timing pulses which are used to control the operation of the measuring system of the invention, as will be described in greater detail hereinafter. The distributor 11 is of conventional design, and, in itself, forms no part of the invention. Various types of distributors found in the art can be used. An example of a distributor which may be used is shown and described in Patent No. 2,734,943, issued February 14, 1956 to Anthony Liguori and Eugene Shenk for Electronic Diplex Receiving Distributor.

When the operation of a telegraph communication system including the distributor 11 is to be tested, a predetermined character of the protected telegraph code used by the telegraph communication system is repetitiously transmitted over one of the channels A or B. The distributor 11 is operated to separate the testing signal containing the repeated predetermined character from the multiplex signal applied to terminal 10. The signal elements included in each of the characters contained in the testing signal are fed from the distributor 11 to a signal receiving unit 14 by connections represented by functional lead 15 which is parallel to the output terminals 12 and 13. Assuming that the signal containing the repeated predetermined character is transmitted over channel A, the distributor 11 continues to feed the regular traffic contained in the signal transmitted over channel B to a utilization circuit by means of the output terminal 13. However, either channel A or B may be used to carry the testing signal. As the predetermined character is sequentially received by signal receiving unit 14, the signal elements of each character received are fed through the signal receiving unit 14 to the operating circuit of a telegraph storage device, for example, a tape perforator 16, by connections represented by functional lead 17. The signal receiving unit 14 is connected to a distortion and transposition detector 18 by connections represented by functional lead 19 and to a known character detector 20 by connections represented by functional lead 21. The known character detector 20 and distortion and transposition detector 18 are connected to the signal receiving unit 14 in such a manner that one of the detectors 18 or 20 is placed in an operating condition by a control signal fed over lead 19 or lead 21, respectively, following the reception by the signal receiving unit 14 of each character contained in the testing signal.

When one of the characters of the protected telegraph code contained in the testing signal is received by the signal receiving unit 14 which has not been distorted during its passage over channel A of the multiplex signal received at terminal 10, the signal receiving unit 14 operates in such a manner that a control signal is fed over lead 21 to the known character detector 20, placing the known character detector 20 in an operating condition. At the same time, a second control signal is fed to the distortion and transposition detector 18 which causes the distortion and transposition detector 18 to be held in a non-operating condition. The distributor 11, having fed a complete character to the signal receiving unit 14, operates to supply a first timing pulse which is fed to a trigger circuit 22 by connections represented by functional lead 23. The trigger circuit 22 operates in response to the first timing pulse to feed a triggering signal to the known character detector 20 by connections represented by functional lead 24. The known character detector 20, having been placed in an operating condition by the reception of the control signal from the signal receiving unit 14, is operated by the triggering signal to bring about the operation of a counting mechanism included in a known character register 25. The counting mechanism of the known character register 25 is moved up one digit indicating the reception of a legitimate character. A second timing pulse separated from the first timing pulse described above by a given time interval is supplied by the distributor 11 and fed to the known character detector 20 by connections represented by functional lead 26. When the known character detector 20 is operated in response to the reception of a legitimate character by the signal receiving unit 14, the known character detector 20 is non-responsive to the second timing pulse. As will be described in greater detail hereinafter, the second timing pulse is used to control the operation of the known character detector 20 and the telegraph tape perforator 16 upon the reception of a distorted character by the signal receiving unit 14. The distributor 11 supplies a third timing pulse separated from the second timing pulse by a given time interval. The third timing pulse is fed to the signal receiving unit 14 by connections represented by functional lead 27. The reception of the third timing pulse by the signal receiving unit 14 serves to reset the operating circuit of the signal receiving unit 14 to its original or standby condition. The control signal fed to the known character detector 20 is discontinued, and the known character detector 20 and the known character register 25 are returned to a non-operating condition. The measuring system of the invention has completed a full sequence of operation, and is readied for the reception by the signal receiving unit 14 of the next character fed thereto from the distributor 11. The measuring system of the invention will continue to operate in the manner described to count by the use of the known character register 25 each legitimate character received by the signal receiving unit 14.

When one of the characters included in the testing signal transmitted over channel A and fed to the signal receiving unit 14 by the operation of the distributor 11 is distorted, the signal receiving unit 14 operates in such a manner that a control signal is fed by means of lead 19 to the distortion and transposition detector 18, placing the distortion and transposition detector 18 in an operating condition. At the same time, a second control signal is fed by means of lead 21 to the known character detector 20 which causes the known character detector 20 to be held in a non-operating condition. A distorted character received by the signal receiving unit 14 may be distorted in one of three ways. The character may contain more or less than the fixed number of marking elements included in each character of the protected telegraph code used by the telegraph communication system. On the other hand, the marking elements included in the distorted character received may be transposed in such a manner that a character of the protective telegraph code other than the predetermined character repetitiously transmitted over channel A is received by the signal receiving unit 14. The signal receiving unit 14 is operated in such a manner that a different control signal is fed to the distortion and transposition detector 18 in response to the reception by the signal receiving unit 14 of each type of distorted character. The distributor 11, having fed a complete character to the signal receiving unit 14, supplies the first timing pulse over lead 23 to the trigger circuit 22. The trigger circuit 22 operates in response to the first timing pulse to feed a triggering signal over lead 24 to the known character detector 20. Because the known character detector 20 is held in a non-operating condition by the control signal fed thereto from the signal receiving unit 14, the triggering signal is fed through the known character detector 20 to the distortion and transposition detector 18 by connections represented by functional lead 28. The distortion and transposition detector 18, having been placed in an operating condition by the control signal fed thereto from the signal receiving unit 14, is operated by the triggering signal to cause the counting mechanism in either a less-than register 29, a more-than register 30 or a transposition register 31 to operate. If the distorted character received by the signal receiving unit 14 contains less than the fixed number of marking elements included in each character of the protected telegraph code, the counting mechanism of the less-than register 29 will be moved up one digit to indicate the reception by the signal receiving unit 14 of that type of distorted character. If the distorted character received by the signal receiving unit 14 contains more than the fixed number of marking elements included in each character of the protected telegraph code, the counting mechanism of the more-than register 30 is moved up one digit to indicate the reception by the signal receiving unit 14 of that type of distorted character. If a character is received by the signal receiving unit 14 containing the proper number of marking elements transposed in such a manner that the character received by the signal receiving unit 14 is not the predetermined character included in the testing signal transmitted over channel A, the counting mechanism of the transposition detector 31 is moved up one digit to indicate the reception by the signal receiving unit 14 of that type of distorted character.

The triggering signal fed to the known character detector 20 from the trigger circuit 22, in addition to being fed through the known character detector 20 to the distortion and transposition detector 18, is fed through the known character detector 20 to the telegraph tape perforator 16 by connections represented by functional lead 32. As previously mentioned, the signal elements of the distorted character received by the signal receiving unit 14 will have been fed through the signal receiving unit 14 to the operating circuit of the telegraph tape perforator 16. The telegraph tape perforator 16 is operated in response to the triggering signal to record in a conventional manner the signal elements of the character fed thereto. For example, the marking elements included in the character received may be reproduced as holes punched in a tape, the holes being arranged according to the arrangement of marking and spacing elements contained in the character. The distributor 11 thereafter operates to supply the second timing pulse which is fed over lead 26 to the known character detector 20. The known character detector 20 which is held in a non-operating condition by the control signal fed thereto from the signal receiving unit 14 is arranged in such a manner that the second timing pulse is fed through the known character detector 20 to the telegraph tape perforator 16 by connections represented by functional lead 33. The telegraph tape perforator 16 operates in response to the second timing pulse to advance the tape upon which the distorted character has been perforated so as to ready the tape for a subsequent operation of the telegraph tape perforator 16. The third timing pulse supplied by the distributor 11 and fed to the signal receiving unit 14 causes the operating circuit of the signal receiving unit 14 to be reset to its original condition. The control signal fed to the distortion and transposition detector 18 is discontinued returning the distortion and transposition detector 18 and the associated register 29, 30 or 31 placed in operation by the operation of the distortion and transposition detector 18 to a non-operating condition. The measuring system of the invention will again have completed a full sequence of operation, the reception of a distorted character by the signal receiving unit 14 having been indicated by the operation of the counting mechanism of one of the registers 29, 30 or 31. By operating the telegraph tape perforator 16 in the manner described, a permanent record is made of the arrangement of signal elements included in each distorted character received by the signal receiving unit 14.

A clock 34 is included in the measuring system of the invention and is electrically connected to a control circuit 35 by connections represented by functional lead 36. The first timing pulses supplied by the distributor 11 and fed to the trigger circuit 22 by means of lead 23 are also fed to the control circuit 35 by connections represented by functional lead 37. The control circuit 35 is normally held in a non-operating condition in response to the reception of the first timing pulse. At the end of regular time intervals of predetermined duration, for example, every thirty minutes, the clock 34 operates to apply a control signal over lead 36 to the control circuit 35. The control circuit 35 is placed in an operating condition and, upon the reception of a triggering signal fed thereto from the trigger circuit 22 by connections represented by functional lead 38, operates to feed a control signal to the telegraph tape perforator 16 by connections represented by functional lead 39. A marking mechanism included in the telegraph tape perforator 16 is operated in response to the control signal fed from the control circuit 35 to place a mark on the tape upon which the arrangement of signal elements included in each distorted character is recorded by the operation of the perforator 16. By placing a mark on the tape at regular time intervals, for example, every thirty minutes during a testing period, the number of distorted characters received during the time interval can be accurately determined.

Referring to Fig. 2, Figs. 2a through 2f taken together, there is shown a schematic diagram of a circuit arrangement constructed according to the invention. Reference is also made to Fig. 3 which is a timing diagram used in explaining the operation of the circuit arrangement shown in Fig. 2. A multiplex signal received over the transmission path of a telegraph communication system using a seven-unit telegraph protected code is fed to an input terminal 10. Although the circuit arrangement shown in Fig. 2 is designed to operate in connection with a seven-unit telegraph code, the circuit arrangement may conveniently be altered to operate in connection with other protected telegraph codes known in the art without departing from the spirit of the invention. In the arrangement shown in Fig. 2, it is assumed that the multiplex signal includes two channels A and B. The multiplex signal is fed from the terminal 10 to a diplex receiving distributor 11, for example, of the type shown and described in Patent No. 2,734,943 referred to above. Normally, the distributor 11 operates to separate the signals received over the two channels and to feed the respective signals to different utilization circuits by means of terminals 12 and 13. The signal received over channel A is fed to a utilization circuit by means of terminal 12, while the signal received over channel B is fed to a utilization circuit by means of terminal 13.

The operation of the circuit arrangement shown in Fig. 2 will first be described in connection with a testing signal received over one of the channels A or B and fed to the input terminal 10. The testing signal may be received over either of the channels. For purposes of description, it will be assumed that the testing signal is received over channel A. The distributor 11 operates to separate the regular message signal received over channel B and the testing signal received over channel A from the multiplex signal. The regular message signal is fed from the distributor 11 to a utilization circuit by means of terminal 13. The testing signal is fed from the distributor 11 to the signal receiving unit 14 by means of a plurality of leads 50 through 56 which are in parallel with terminal 12.

The testing signal comprises a continuously repeated character of the seven-unit telegraph protected code, and may be provided, for example, by inserting an endless tape, upon which the character has been recorded repetitiously, in the transmitting contacts of channel A located at the telegraph transmitting station included in the telegraph communication system. As the character of the testing signal is received by the distributor 11, the elements of the character are presented serially in time to the leads 50 through 56. The first element of the character is presented to lead 50, the second element is presented to lead 51, the third element is presented to lead 52 and so on. It will be assumed that the testing signal comprises the character "A" of the seven-unit telegraph protected code repetitiously received over channel A. However, any character of the seven-unit telegraph protected code may be used by altering certain coincidence voltage points in the circuit arrangement shown in Fig. 2, as will be described in greater detail. The character "A" in the seven-unit telegraph protected code consists of seven elements with the third, fourth and sixth elements in a marking condition and the first, second, fifth and seventh elements in a spacing condition. Therefore, in the reception of a character "A" by the distributor 11 over channel A, a marking element or pulse is presented to the three leads 52, 53 and 55 and a spacing element or no pulse is presented to the four leads 50, 51, 54 and 56.

The signal receiving unit 14, shown in Figs. 2a, 2b, 2c, comprises seven bistable multivibrators 57 through 63 which are of similar construction. The multivibrators 57 through 63 are of conventional design, and the operation thereof is well understood in the art. Each of the multivibrators 57 through 63 includes a pair of triode vacuum tubes arranged in a circuit possessing two conditions of stable equilibrium. In one condition, one side or tube of the multivibrator is conducting, and the other side or tube of the multivibrator is cut off. In the second condition, the tube previously cut off is conducting, and the tube previously conducting is cut off. The circuit of the multivibrator remains in either the first or second condition until some action occurs which triggers the multivibrator into the opposite state of equilibrium or condition. Because of the sudden reversal from one condition of equilibrium to the other, this type of circuit is often referred to in the art as a flip-flop circuit. The pair of triode tubes included in each of the multivibrators 57 through 63 may be mounted in the common envelope of a duo-triode vacuum tube resulting in a conservation of space and greater ease of operation. For purposes of description, each of the triode tubes included in the multivibrators 57 through 63 have been designated by the letter V followed by a number indicating the particular multivibrator in which the tube occurs. The letter A or B has been added to the designation to provide means for distinguishing between the pair of triode tubes included in each of the multivibrators. Thus, multivibrator 57 includes a pair of triode tubes V1A and V1B, multivibrator 58 includes a pair of triode tubes V2A and V2B and so on through multivibrator 63 which includes a pair of triode tubes V7A and V7B.

In standby condition, the right hand tubes or the tubes designated by the letter B of each of the multivibrators 57 through 63 are conducting, the left hand tubes or the tubes designated by the letter A of the respective multivibrators being cut off. The plates of tubes V1A, V2A, V3A, V4A, V5A, V6A and V7A are connected to the control grid of triode tube V8, Fig. 2d, by an electrical path including leads 64 through 70 and resistors 71 through 77, respectively, lead 78 and lead 79. The positive voltage applied to the control grid of tube V8 causes the tube V8 to normally conduct. The plate voltage of tube V8 which is applied to the control grid of pentode tube V9 is sufficiently negative to maintain the tube V9 in a cut off condition. The plates of tubes V1A, V2A, V3A, V4A, V5A, V6A and V7A are also connected to the control grid of triode tube V10, Fig. 2e, by an electrical path including leads 64 through 70 and resistors 83 through 89, respectively, lead 90 and lead 91. Tube V10 is normally conducting due to the positive voltage applied to the control grid thereof, causing the voltage applied to the control grid of pentode tube V11 to be sufficiently negative to maintain the tube V11 in a cut off condition. Tubes V8, V9, V10 and V11 constitute the distortion and transposition detector 18 of the measuring system. The plates of tubes V1A, V2A, V3B, V4B, V5A, V6B and V7A are connected to the control grid of pentode tube V12, Fig. 2f, by an electrical path includign leads 64, 65, 92, 93, 68, 94, 70 and resistors 95 through 101, respectively, lead 102 and lead 103. The voltage applied to the control grid of tube V12 is sufficiently negative to maintain the tube V12 normally in a cut off condition. Tube V12 constitutes the known character detector 20 of the measuring system. Three coincidence voltage points are, therefore, provided. The left hand tubes of the multivibrators 57 through 63 form a coincidence voltage point for the control grid of tubes V8 and V10. The left hand tubes of multivibrators 57, 58, 61, 63, and the right hand tubes of multivibrators 59, 60, 62 form a coincidence voltage point for the control grid of tube V12.

The plates of tubes V1B, V2B, V3B, V4B, V5B, V6B and V7B are each connected by an electrical path including leads 104 through 110, respectively, to the control grid of one of the triode tubes V13 through V19. The control grids of tubes V13 through V19 are normally biased sufficiently negative to maintain the respective tubes in cut off condition. Each of the plate circuits of the tubes V13 through V19 includes one of the windings 111 through 117 of seven signal punching units located in the seven-unit code tape perforator 16. The plates of tubes V13 through V19 are separately connected to the respective windings 111 through 117 by leads 181 through 187, respectively. Winding 111 is included in the plate circuit of tube V13, winding 112 is included in the plate circuit of tube V14 and so on. The windings 111 through 117 are each arranged to operate a punch pin included in the tape perforator 16. By the selective operation of the different punch pins according to the manner in which the windings 111 through 117 are energized by the operation of tubes V13 through V19, the signal punching units of the perforator 16 are operated to record information as holes punched in a tape. It may be seen, therefore, that the multivibrators 57 through 63 control the operation of the tape perforator 16, the known character detector 20 and the distortion and transposition detector 18.

In describing the operation of the circuit arrangement shown in Fig. 2, it will first be assumed that the character "A" included in the testing signal has been received correctly. The leads 50 through 56 are each connected to the plate circuit of one of the tubes V1A, V2A, V3A, V4A, V5A, V6A and V7A. Lead 50 in connected to the plate circuit of tube V1A, lead 51 is connected to the plate circuit of tube V2A and so on. Referring to the timing diagram shown in Fig. 3, given only by way of example, the distributor 11 will have presented at the end of 81.62 milliseconds the seven elements of the received character serially in time over the leads 50 through 56 to the left hand tubes of the multivibrators 57 through 63. The timing pulses shown in the timing diagram of Fig. 3 are produced as a function of the operation of the distributor 11 in the manner described, for example, in Patent No. 2,734,943 referred to above. As previously stated, the first, second, fifth and seventh elements of the character "A" are in a spacing condition and the third, fourth and sixth elements are in a marking condition. The marking elements appear in the plate circuits of tubes V3A, V4A and V6A as, for example, a minus twenty volt pulse. The pulse applied to tubes V3A, V4A and V6A causes multivibrators 59, 60 and 62 to flip over so that tubes V3A, V4A and V6A become conducting and tubes V3B, V4B and V6B are cut off. The coincidence voltage applied to the control grid of tube V12 over the electrical path including leads 102 and 103 is no longer negative but becomes slightly positive. Tube V12 conducts, energizing the winding 118 of a polar relay 119. Polar relay 119, in addition to the winding 118, includes a bias winding 120, an armature 121 and contacts 122, 123. Normally, the bias winding 120 causes the armature 121 to engage contact 122, as shown in Fig. 2f. When the winding 118 is energized by the conduction of tube V12, armature 121 disengages contact 122 and engages contact 123.

At the end of the 81.62 milliseconds interval during which the distributor 11 is presenting the elements of the received character over leads 50 through 56, a punch local timing pulse is produced at local eight time by the distributor 11 and applied over an electrical path including leads 23 and 126 to a mono-stable multivibrator 124 of conventional design. The multivibrator 124 includes a pair of triode tubes V20 and V21 which can be arranged in a duo-triode vacuum tube, as shown in Fig. 2e. The multivibrator 124 is included in a circuit which possesses a single condition of stable equilibrium. Normally, tube V21 is conducting, and tube V20 is cut off. The multivibrator 124 can be triggered into a second condition in which tube V21 is cut off and tube V20 is conducting. However, following a time interval determined by the value of capacitor 125 and of a resistor 188 tied to the control grid of tube V21, the multivibrator 124 will automatically revert back to the original condition or condition of stable equilibrium. In the arrangement shown in Fig. 2e, the punch local timing pulse is applied to the plate circuit of tube V20. The multivibrator 124 is triggered, causing tube V20 to conduct and tube V21 to cut off. The voltage at the plate of tube V21 becomes more positive, and, as a result, the voltage applied to the control grid of pentode tube V22 also becomes positive. Tube V22 conducts and winding 127 is energized. The armature 128 engages contact 129 completing an electrical path from the terminal 130 of a source of positive potential to ground including lead 131, lead 132, armature 121 and contact 123 of polar relay 119 and the counting mechanism in the known character register 25. The term ground, as used in the specification, is to be understood as referring to a point of fixed or zero alternating reference potential. It is assumed, by way of example, that the terminals marked plus shown in Fig. 2 are connected to a source of positive 120 v. D. C., while the terminals marked minus are connected to a source of negative 150 v. The counting mechanism in the known character register 25 moves up one digit, indicating the reception by the measuring system of a correct character. At the end of the time interval determined by the value of capacitor 125 and of resistor 188, for example, forty milliseconds, the multivibrator 124 is restored to the original condition or condition of stable equilibrium. Tube V20 is cut off, and tube V21 conducts, causing tube V22 to cut off. Winding 127 is deenergized, and armature 128 disengages contact 129, removing the voltage from the known character register 25.

The circuit of the measuring system is now in a quiescent period until local thirteen time. At local thirteen time an advance local timing pulse is produced by the distributor 11 and applied over an electrical path including lead 26 from the distributor 11 to a diode 133 in the cathode circuit of tube V12. While a diode rectifier is shown in the drawing, the device 133 may be in actual practice any known unilateral device which will present a low impedance at the operating frequency between the cathode of tube V12 and ground. Since tube V12 is conducting, the diode 133 presents a very low impedance and a pulse is not developed there-across. The diode 133 is also connected to a mono-stable multivibrator 134 by an electrical path including capacitor 135. Multivibrator 134 includes a pair of triode tubes V23 and V24 and is of the same conventional design and operation as multivibrator 124 to which reference has previously been made. As no pulse is developed across diode 133, the multivibrator 134 is not triggered and remains in the condition of stable equilibrium.

At local fourteen time a reset local timing pulse is produced by the distributor 11 and applied over an electrical path including lead 27 to the control grids of duo-triode tube V25. Tube V25, normally conducting, is cut off for the duration of the pulse, causing the voltage applied to the control grids of tubes V1B, V2B, V3B, V4B, V5B, V6B and V7B over an electrical path including lead 136 to become more positive. It will be remembered that the multivibrators 59, 60 and 62 changed condition in response to the marking elements presented thereto from the distributor 11. Tubes V3B, V4B and V6B, normally conducting, are cut off, while tubes V3A, V4A and V6A, normally cut off, are conducting. When the voltage applied to the control grids of tubes V3B, V4B and V6B from the tube V25 becomes more positive, the multivibrators 59, 60 and 62 are restored to their initial condition. Tubes V3A, V4A and V6A are cut off, and tubes V3B, V4B and V6B conduct. Multivibrators 57, 58, 61 and 63 did not change condition in response to the operation of distributor 11 and will continue to remain in the initial condition with the right hand tubes V1B, V2B, V5B and V7B conducting and the left hand tubes V1A, V2A, V5A and V7A cut off. The coincidence voltage applied to the control grid of tube V12 over the electrical path including lead 102 and lead 103 becomes negative, causing tube V12 to cut off. Winding 118 of polar relay 119 is deenergized, and armature 121 disengages contact 123 and engages contact 122. The measuring system of the invention has completed a full sequence of operation and is ready to receive the next character of the testing signal presented thereto from the distributor 11. The measuring system of the invention will operate in the manner described in response to each correct character of the testing signal received. For each correct character or character "A" received, the counting mechanism of the known character register 25 will move up one digit.

As described in connection with Fig. 1, a character of the testing signal received over channel A by the distributor 11 can be distorted in one of three ways. The elements of the character can be transposed so that a character including three marking elements other than the third, fourth and sixth elements is received. The character can include less than three marking elements or more than three marking elements. In the case of a distorted character due to the transposition of elements, three of the multivibrators 57 through 63 are made to change condition in response to the marking elements presented thereto in the same manner as are the multivibrators 59, 60 and 62 when a correct character is received. It is to be noted, however, that the group of three multivibrators which change condition are not the same group of three multivibrators 59, 60 and 62 operated in response to the reception by the distributor 11 of a correct character. As previously mentioned, the left hand tubes of multivibrators 57, 58, 61, 63 and the right hand tubes of multivibrators 59, 60, 62 form a coincidence voltage point for the control grid of tube V12. When any number or group of the multivibrators 57 through 63 other than the three multivibrators 59, 60 and 62 are made to change condition, the coincidence voltage applied to the control grid of tube V12 over the electrical path including leads 102 and 103 is negative. In other words, the voltage applied to the control grid of tube V12 is negative for any character of the testing signal received by the distributor 11 over channel A other than the character "A" of the seven-unit telegraph protected code, the distributor 11 operating to present the elements of each character received serially in time to the multivibrators 57 through 63 over leads 50 through 56, respectively. Tube V12 is, therefore, normally cut off, and remains in a cut off condition upon the reception by the distributor 11 of a character of the testing signal which has been distorted by a transposition of elements. Winding 118 of polar relay 119 remains deenergized, and the bias winding 120 of polar relay 119 causes armature 121 to engage contact 122.

Reference has been made to the coincidence voltage points formed by the left hand tubes of multivibrators 57 through 63 for the control grids of tubes V8 and V10. Tube V8 is biased by a circuit including a resistor 82 connected between the cathode thereof and the terminal 137 of a source of negative potential. The level of the voltage applied to the control grid of tube V8 over the electrical path including leads 78 and 79 depends on the number of the left hand tubes V1A, V2A, V3A, V4A, V5A, V6A, V7A of multivibrators 57 through 63, respectively, which are conducting at any given time. Normally, the left hand tubes of multivibrators 57 through 63 are cut off, and a positive voltage is applied to the control grid of tube V8. When certain ones or all of the multivibrators 57 through 63 are made to change condition in response to the elements presented thereto from the distributor 11, the level of the voltage applied to the control grid of tube V8 becomes more negative. The value of resistor 82 is set so that tube V8 is biased to cut off in response to the negative voltage applied to the control grid thereof whenever more than two of the multivibrators 57 through 63 are made to change condition. In other words, whenever the left hand tubes of more than two of the multivibrators 57 through 63 become conducting, the coincidence voltage applied to the control grid of tube V8 is sufficiently negative to cause tube V8 to cut off. Tube V10 is biased by a circuit similar to that used to bias tube V8. A resistor 138 is connected between the cathode of tube V10 and a terminal 139 of a source of negative potential. However, the value of resistor 138 is set so that tube V10 is biased to cut off in response to the negative voltage applied to the control grid thereof whenever more than three of the multivibrators 57 through 63 are made to change condition. Therefore, it is necessary that the left hand tubes of more than three of the multivibrators 57 through 63 become conducting before the voltage applied to the control grid of tube V10 is sufficiently negative to cause tube V10 to cut off.

When a character of the testing signal is received distorted due to the transposition of elements, the character will include three elements in a marking condition. The elements are arranged according to a character of the seven-unit telegraph protected code other than the character "A." The three multivibrators of the multivibrators 57 through 63 to which the marking elements included in the character are presented change condition, causing the left hand tubes of the respective multivibrators to conduct. The coincidence voltage applied to the control grid of tube V10 is not sufficiently negative to cause tube V10 to cut off. On the other hand, the coincidence voltage applied to the control grid of tube V8 is sufficiently negative to cause tube V8 to cut off. When tube V8 cuts off, the voltage applied to the control grid of tube V9 becomes positive, causing tube V9 to conduct. The winding 80 of polar relay 140 is included in the plate circuit of tube V9. Polar relay 140, in addition to winding 80, includes a bias winding 141, an armature 142 and contacts 143, 144. The bias winding 141 causes the armature 142 to normally engage contact 143. When tube V9 conducts, winding 80 is energized and armature 142 disengages contact 143 and engages contact 144.

At local eight time, the punch local timing pulse is produced by the distributor 11 and applied over the electrical path including lead 23 and lead 126 to the plate of tube V20 included in mono-stable multivibrator 124.

Multivibrator 124 changes condition, and the voltage applied to the control grid of tube V22 becomes positive. Tube V22 conducts, and the winding 127 is energized. Armature 128 engages contact 129 completing an electrical path from the terminal 130 of a source of positive potential to ground including lead 131, lead 132, armature 121 and contact 122 of polar relay 119, lead 145, armature 142 and contact 144 of polar relay 140, armature 146 and contact 147 of a polar relay 148 and the counting mechanism of a transposition register 31. The counting mechanism of the register 31 is moved up one digit recording the reception of the character distorted by a transposition of elements. At the same time two other electrical paths are completed. An electrical path is completed from the terminal 130 to ground including lead 131, lead 132, armature 121 and contact 122 of polar relay 119, lead 145, lead 149, contact 150 and armature 151 of a polar relay 152, lead 153 and the winding 154 of a feed hole punching unit located in the perforator 16. The winding 154 of the feed hole punching unit is arranged to operate a punch pin and is energized by the closing of armature 128 and contact 129, causing the punch pin to place a feed hole in the tape fed through the perforator 16. A further electrical path is completed from the terminal 130 to the plate of tubes V13 through V19 including lead 131, lead 132, armature 121 and contact 122 of polar relay 119, lead 145, and the respective windings 111 through 117 of the signal punching units located in the perforator 16.

The control grid of each of the tubes V13 through V19 is individually connected to one of the right hand tubes of the multivibrators 57 through 63 by an electrical path including leads 104 through 110, respectively. When the condition of one of the multivibrators 57 through 63 is changed in response to a marking element presented thereto from the distributor 11, the right hand tube of that multivibrator is cut off. The voltage applied to the control grid of the particular one of the tubes V13 through V19 connected to the right hand tube of the multivibrator which has changed condition becomes more positive. As previously mentioned, three of the multivibrators 57 through 63 have changed condition in response to the marking elements included in the distorted character received. The right hand tubes of the three multivibrators are cut off, and the voltage applied to the control grid of three of the tubes V13 through V19 becomes more positive. When armature 128 engages contact 129, the positive voltage applied to the plates of tubes V13 through V19 over the electrical path including the windings 111 through 117 causes the three tubes of tubes V13 through V19 individually connected to the right hand tubes of the multivibrators which have changed condition to conduct. Three of the windings 111 through 117 of the signal punching units located in the perforator 16 are energized, and the three punch pins operated by the energized windings each place a hole in the tape fed through the perforator 16. The tape is positioned in relation to the seven punch pins of the signal punching units located in the perforator 16 so that the holes are placed in line with the feed hole placed in the tape by the operation of the feed hole punching unit and across the width of the tape. The holes made by the punch pins of the signal punching units will be positioned across the width of the tape according to the manner in which the marking elements are positioned in the arrangement of the seven elements of the distorted character presented to the multivibrators 57 through 63 from the distributor 11. For example, assuming that the first, second and third elements of the seven elements of the received character are in a marking condition, multivibrators 57, 58 and 59 change condition. Tubes V1B, V2B, and V3B are cut off, causing the voltage applied to the control grid of tubes V13, V14 and V15 to become more positive. When armature 128 and contact 129 close, tubes V13, V14 and V15 conduct, windings 111, 112 and 113 are energized, causing the three punch pins operated by these windings to each place a hole in the tape fed through the perforator 16. The distorted character will, therefore, be recorded on the tape with the holes arranged in the same order as were the marking elements included in the character.

At the end of forty milliseconds, multivibrator 124 is restored to the condition of stable equilibrium. Tube V22 is cut off, and the winding 127 is deenergized. Armature 128 disengages contact 129, and the counting mechanism of the transposition register 31 is returned to standby condition. Winding 154 of the feed hole punching unit is deenergized, and the positive voltage is removed from the plates of tubes V13 through V19. The three windings of the signal punching units located in the perforator 16 which were previously energized, for example, windings 111, 112 and 113, are deenergized. The feed hole punch pin and the three punch pins which were operated by the windings of the signal punching units are returned to their initial position.

The measuring system is now quiescent until local thirteen time. At local thirteen time the advance local timing pulse is produced by the operation of the distributor 11 and is applied to the diode 133 over an electrical path including lead 26. Tube V12 is cut off, and the diode 133, therefore, represents a high impedance. A pulse is developed across the diode 133 and applied to the plate of tube V23 of mono-stable multivibrator 134. This causes the multivibrator 134 to be shifted from the single condition of stable equilibrium with tube V24 conducting and tube V23 cut off to the condition with tube V24 cut off and tube V23 conducting. The duration of time in which the multivibrator 134 will remain in the second condition is determined by the value of capacitor 155 and of the resistor 189 tied to the control grid of tube V24. As in the case of the capacitor 125 and resistor 188 of the multivibrator 124, it is assumed that the value of the capacitor 155 and of the resistor 189 is set to produce a delay of forty milliseconds in the restoration of multivibrator 134 to the single condition of stable equilibrium. When tube V24 is cut off, the voltage applied to the control grid of tube V26 over an electrical path including lead 156 which is normally negative, becomes sufficiently positive to cause tube V26 to conduct. The plate of tube V26 is connected through the winding 157 of an advance mechanism located in the perforator 16 to the terminal 158 of a source of positive potential. When tube V26 conducts, the winding 157 is energized, allowing the advance mechanism to advance the tape fed through the perforator 16 to a new position. The perforator 16 is readied to record a succeeding distorted character presented to the measuring system.

At local fourteen time the reset local timing pulse is produced by the operation of distributor 11 and is applied over the electrical path including lead 27 to the control grid of tube V25. Tube V25 is cut off, and a positive voltage is applied to the control grid of tubes V1B, V2B, V3B, V4B, V5B, V6B and V7B over the electrical path including lead 136. The three multivibrators of the signal receiving unit 14 which changed conditions in response to the marking elements included in the distorted character received are restored to the initial condition. The left hand tubes of the multivibrators 57 through 63 are again all cut off, and the right hand tubes of the multivibrators 57 through 63 are again all conducting. The coincidence voltage applied to the control grid of tube V8 from the coincidence voltage point formed by the left hand tubes of multivibrators 57 through 63 becomes positive. Tube V8 conducts, causing tube V9 to cut off. Winding 80 of polar relay 140 is deenergized, and the bias winding 141 of polar relay 140 causes armature 142 to disengage contact 144 and engage contact 143. Referring to the timing diagram of Fig. 3, it should be noted that the multivibrators 57 through 63 are reset to the initial condition and made ready to receive the elements of the next character presented thereto over leads 50 through 56, respectively, from the distributor 11 even though the tape advance action in the perforator 16 is still in progress. This is no way affects the satisfactory operation of the measuring system, because the character stored in the multivibrators 57 through 63 of the signal receiving unit 14 is no longer needed. The arrangement of the elements in the character has been recorded by the operation of the perforator 16, and the reception of the character has been counted by the operation of the counting mechanism in the transposition register 31. There is a considerable amount of time between the end of the operation of the tape advance mechanism in the perforator 16 and the possible beginning of the next hole punching operation by the perforator 16 at local eight time. However, after forty milliseconds beyond the local thirteen time, multivibrator 134 automatically reverts to the condition of stable equilibrium. Tube V24 conducts, and the voltage applied to the control grid of tube V26 becomes negative. Tube V26 is cut off, winding 157 is deenergized and the tape advance mechanism in perforator 16 ceases functioning. The measuring system of the invention will have again completed a full sequence of operation. Whenever a character including three marking elements other than the character "A" of the seven-unit telegraph protected code is received, the measuring system of the invention will operate in the manner described to count the reception of the character by the operation of the counting mechanism in the transposition register 31 and to record the arrangement of elements included in the distorted character by the operation of the perforator 16.

The character "A" included in the testing signal forwarded over channel A of the multiplex signal received at the terminal 10 can be mutilated or distorted during transmission such that the received character includes less than three elements in marking condition or more than three elements in marking condition. The elements of the distorted character received by the distributor 11 from the terminal 10 are presented serially in time to the multivibrators 57 through 63 of the signal receiving unit 14 over leads 50 through 56, respectively. Because a character other than the character "A" of the seven-unit telegraph protected code is received when both types of distortion are present, the coincidence voltage from the coincidence voltage point formed by the left hand tubes of the multivibrators 57, 58, 61, 63 and the right hand tubes of multivibrators 59, 60 and 62 and applied to the control grid of tube V12 over the electrical path including leads 102 and 103 is negative. When both types of the distorted characters are received, tube V12, therefore, remains in a cut off condition. It will be remembered that the coincidence voltage points formed by the left hand tubes of the multivibrators 57 through 63 for the control grid of tubes V8 and V10 are such that the tube V8 is cut off when more than three of the multivibrators 57 through 63 are made to change condition in response to marking elements. If less than three elements in a marking condition are presented to the multivibrators 57 through 63, the coincidence voltage applied to the control grid of tube V8 over the electrical path including leads 78 and 79 and to the control grid of tube V10 over the electrical path including leads 90 and 91 will continue to be sufficiently positive to cause tubes V8 and V10 to conduct. A negative voltage is applied to the control grid of tubes V9 and V11, and tubes V9 and V11 are cut off. Armature 142 of polar relay 140 continues to engage contact 143, and armature 146 of polar relay 148 continues to engage contact 147, as shown in Fig. 2d of the drawings. At local eight time the punch local timing pulse is produced by the distributor 11 and applied over the electrical path including lead 23 to the plate of tube V20 of the mono-stable multivibrator 124. Multivibrator 124 assumes a condition with tube V21 cut off and tube V20 conducting. A positive voltage is applied from the plate of tube V21 to the control grid of tube V22. Tube V22 conducts, winding 127 is energized and armature 128 engages contact 129. An electrical path is completed from the terminal 130 of a source of positive potential to ground including lead 131, lead 132, armature 121 and contact 122 of polar relay 119, lead 145, armature 142 and contact 143 of polar relay 140 and the counting mechanism of the less-than-three register 29. The counting mechanism of the register 29 is moved up one digit indicating the reception of a distorted character including less than three elements in a marking condition. At the same time a positive voltage is applied through the windings 111 through 117 of the signal punching units located in the perforator 16 to the plates of tubes V13 through V19, respectively. A positive voltage is also applied to the winding 154 of the feed hole punching unit located in the perforator 16. When two or less of the multivibrators 57 through 63 are made to change condition in response to the marking elements presented thereto from the distributor 11, a positive voltage is applied to the control grid of two or less of the tubes V13 through V19, the right hand tube of each of the multivibrators 57 through 63 being individually connected to the control grid of one of the tubes V13 through V19. When armature 128 and contact 129 close, the two or less tubes of tubes V13 through V19 connected to the multivibrators 57 through 63 which have changed condition in response to a marking element conduct. When the two or less tubes of V13 through V19 conduct, the two or less windings of the windings 111 to 117 of the signal punching units located in the perforator 16 and connected to the plates thereof are energized. The punch pins operated by the energized windings will each place a hole in the tape fed through the perforator 16. The punch pin of the feed hole punching unit which is operated by the energization of windings 154 also places a feed hole in the tape. The holes are placed in the tape in the same order in which the marking elements are positioned in the arrangement of the seven elements of the distorted character received.

After forty milliseconds multivibrator 124 automatically reverts to the condition of stable equilibrium. Tube V22 is cut off, winding 127 is deenergized and armature 128 and contact 129 open. The counting mechanism of the less-than-three register 29 is returned to standby condition. Winding 154 of the feed hole punching unit is deenergized, and the positive voltage is removed from the plate of tubes V13 through V19. The two or less windings of the windings 111 through 117 which were previously energized are deenergized. The feed hole punch pin and the punch pins of the signal punching units which were operated by the selective energization of the windings 111 through 117 are returned to their initial position. At local thirteen time the advance local timing pulse is produced by the operation of the distributor 11 and is again applied to the diode 133 over the electrical path including lead 26. Tube V12 is cut off, and the diode 133 represents a high impedance. The pulse developed across the diode 133 is applied to the plate of tube V23 of the mono-stable multivibrator 124. Tube V24 is cut off, and a positive voltage is applied to the control grid of tube V26 over the electrical path including lead 156. Tube V26 conducts, and the winding 157 of the tape advance mechanism in the perforator 16 is energized. At local fourteen time the reset local timing pulse is produced by the operation of distributor 11 and is applied over the electrical path including lead 27 to the control grid of tube V25. Tube V25 is cut off, and a positive voltage is applied to the control grid of the right hand tubes of the multivibrators 57 through 63. The two or less multivibrators of the signal receiving unit 14 which changed condition in response to the marking elements included in the distorted character received are restored to their initial condition. After forty milliseconds beyond the local thirteen time, multivibrator 134 automatically reverts to the condition of stable equilibrium. Tube V24 conducts, and a negative voltage is applied to the control grid of tube V26. Tube V26 is cut off, and the winding 157 of the tape advance mechanism in the perforator 16 is deenergized. The distorted character including less than three elements in a marking condition is counted by the operation of the counting mechanism of the register 29 and the arrangement of elements in the distorted character are recorded by the operation of the perforator 16.

If a distorted character including more than three elements in a marking condition is received, the coincidence voltage applied to the control grid of tubes V8 and V10 is sufficiently negative to cause both of the tubes V8 and V10 to cut off. When tube V8 is cut off, a positive voltage is applied to the control grid of tube V9. Tube V9 conducts and the winding 80 of polar relay 140 is energized. Armature 142 of polar relay 140 disengages contact 143 and engages contact 144. When tube V10 is cut off, a positive voltage is applied to the control grid of tube V11. Winding 159 of polar relay 148 is energized. Armature 146 of polar relay 148 is normally made to engage contact 147 by the bias winding 160. When winding 159 is energized, armature 146 disengages contact 147 and engages contact 161. At local eight time the punch local timing pulse is produced by the distributor 11 and is applied to the plate of tube V20 of multivibrator 124 over the electrical path including leads 23 and 126. When tube V21 is cut off, a positive voltage is applied to the control grid of tube V22. Tube V22 conducts, winding 127 is energized and armature 128 and contact 129 close. An electrical path is completed from the terminal 130 of a source of positive potential to ground including lead 131, 132, armature 121 and contact 122 of polar relay 119, lead 145, armature 142 and contact 144 of polar relay 140, armature 146 and contact 161 of polar relay 148 and the counting mechanism of the more-than-three register 30. The counting mechanism of the register 30 moves up one digit indicating the reception of a distorted character including more than three elements in a marking condition. A positive voltage is applied to the winding 154 of the feed hole punching unit located in the perforator 16. A positive voltage is also applied through the windings 111 through 117 of the signal punching units located in the perforator 16 to the plates of tubes V13 through V19. Any four or more of the tubes V13 through V19 will have their control grids positive with respect to ground in accordance with the particular multivibrators 57 through 63 which were made to change condition in response to the marking elements presented thereto from the distributor 11. When the armature 128 and contact 129 close, the tubes V13 through V19 which have their control grids positive with respect to ground conduct. Four or more of the windings 111 through 117 are energized causing the punch pins operated thereby to each place a hole in the tape fed through the perforator 16. The punch pin operated by the winding 154 will also place a feed hole in the tape. After forty milliseconds multivibrator 124 is automatically restored to its condition of stable equilibrium. Tube V22 is cut off, winding 127 is deenergized and armature 128 and contact 129 open. The counting mechanism of the more-than-three register 30 is returned to standby condition. The positive voltage applied to the plates of tubes V13 through V19 and to the winding 154 is removed causing the punch pins of the signal punching units and of the feed hole punching unit located in the perforator 16 to return to their initial position. At local thirteen time the advance local timing pulse is produced by the distributor 11 and is applied to the diode 133 over the electrical path including lead 26. Winding 157 is energized, and the tape advance mechanism in the perforator 16 is operated in the same manner previously described to ready the perforator 16 for operation in response to a succeeding distorted character presented from the distributor 11 to the signal receiving unit 14. At local fourteen time the reset local timing pulse is produced by distributor 11 and is applied to the control grids of tube V25 over the electrical path including lead 27. Tube V25 is cut off, and a positive voltage is applied to the control grid of the right hand tubes of the multivibrators 57 through 63. The four or more of the multivibrators 57 through 63 which have changed condition in response to the marking elements included in the distorted character received are restored to their initial condition. The coincidence voltage applied to the control grid of tubes V8 and V10 will become positive, causing tubes V8 and V10 to conduct. Tubes V9 and V11 are cut off. Winding 80 of polar relay 140 is deenergized, and the bias winding 141 of polar relay 140 causes the armature 142 to disengage contact 144 and engage contact 143. Winding 159 of polar relay 148 is deenergized, and the bias winding 160 of polar relay 148 causes armature 146 to disengage contact 161 and engage contact 147. The reception of the distorted character including more than three elements in a marking condition has been counted by the operation of the counting mechanism of register 30, and the arrangement of the elements included in the distorted character has been recorded by the operation of the perforator 16.

The measuring system of the invention, therefore, will operate to count on an individual basis by the operation of the registers 29, 30 and 31 the different types of distorted characters included in the testing signal received over channel A of the multiplex signal, and will also counte the correct characters received by the operation of register 25. The arrangement of elements in each type of distorted character is recorded by the operation of the perforator 16. The operation of the circuit arrangement constructed according to the invention and shown in Fig. 2 has been described in connection with a testing signal consisting of the character "A." Actually, the testing signal may consist of any character of the seven-unit protected telegraph code desired. By rearranging the connections from the multivibrators 57 through 63 to the coincidence voltage point formed for the control grid of tube V12, the circuit arrangement can be made to operate in exactly the same manner described in response to any character used in the testing signal.

The measuring system of the invention has an additional feature. At a particular time interval, for example every thirty minutes, a clock 34, shown in Fig. 2f, will operate to apply a negative pulse to the plate of tube V27 of a bistable multivibrator 162 over an electrical path including capacitor 163. The multivibrator 162 is of a design and operation similar to that of the multivibrators 57 through 63 included in the signal receiving unit 14. The multivibrator 162 includes a pair of tubes V27 and V28. The advance local timing pulse produced by the distributor 11 and applied to the plate of tube V20 of multivibrator 124 is also applied over an electrical path including capacitor 165 and lead 166 to a diode 164 connected to the cathode of tube V28. The negative pulses developed across the diode 164 cause the normal condition of multivibrator 162 to be a condition with the tube V28 conducting and the tube V27 cut off. When the negative pulse is applied from the clock 34 over the electrical path including capacitor 163 to the plate of tube V27, the multivibrator 162 changes condition so that tube V27 is conducting and tube V28 is cut off. At local eight time the punch local timing pulse applied to the plate of tube V20 and to the diode 164 over the electrical path including capacitor 165 and lead 166 causes the cathode of tube V28 to go negative, thus, restoring multivibrator 162 to the normal or initial condition. When multivibrator 162 is restored to the initial condition, a negative voltage is applied from the plate of tube V28 to the cathode of tube V29 of a bistable multivibrator 179. The bistable multivibrator 179 is also of a design and operation similar to that of the multivibrators 57 through 63 of the signal receiving unit 14. The multivibrator 179 includes a pair of tubes V29 and V30. When the reset local timing pulse is produced by the operation of distributor 11 and applied to the control grid of tube V25 over the electrical path including lead 27, the reset local timing pulse is also applied to the plate of tube V30 over an electrical path including lead 27, lead 167, and capacitor 168. The reset local timing pulses applied to the plate of tube V30 causes the normal condition of multivibrator 179 to be a condition with tube V30 conducting and tube V29 cut off. When the negative voltage is applied to the cathode of tube V29 from the plate of tube V28, the multivibrator 179 assumes a condition with tube V30 cut off and tube V29 conducting. When tube V30 is cut off, a positive voltage is applied from the plate of tube V30 to the control grid of tube V31 over an electrical path including lead 169. Multivibrators 162, 179 and tube V31 constitute the control circuit 35 shown in the block diagram of Fig. 1.

At local eight time the punch local timing pulse applied to the plate of tube V20 will cause the multivibrator 124 to change condition. Tube V22 conducts, winding 127 is energized and the armature 128 and the contact 129 close. An electrical path is completed from the terminal 130 of a source of positive potential to the plate of tube V31 including lead 173, the winding 174 of a timing punching unit and lead 175. Tube V31 conducts, winding 174 is energized and a punch pin is operated to place a hole or mark on the tape fed through the perforator 16. Winding 170 of polar relay 152 is also energized. The bias winding 171 of polar relay 152 causes the armature 151 to normally engage contact 150. When winding 170 is energized, armature 151 disengages contact 150 and engages contact 172.

A further electrical path is completed from the terminal 130 to ground including lead 131, contact 172 and armature 151 of polar relay 152, lead 153 and the winding 154 of the feed hole punching unit located in the perforator 16. Winding 154 is energized, and the punch pin operated thereby places a feed hole in the tape. At the end of forty milliseconds multivibrator 124 is automatically restored to the condition of stable equilibrium, and the positive voltage is removed from the plate of tube V31. Tube V31 is cut off. Windings 154 and 174 are deenergized, and the punch pins of the timing punching unit and of the feed hole punching unit are returned to their initial positions. Winding 170 of polar relay 152 is deenergized, and the bias winding 171 of polar relay 152 causes the armature 151 to disengage contact 172 and engage contact 150. At local thirteen time the advance local timing pulse will cause the multivibrator 134 to change condition or remain unchanged, depending upon whether the tube V12 is conducting or cut off. If a distorted character has been presented to the measuring system, tube V12 is cut off, and the multivibrator 134 will operate to cause the tape advance mechanism in the perforator 16 to operate as previously described. If a correct character or character "A" is received by the measuring system, tube V12 is conducting, and the multivibrator 134 will prevent the tape advance mechanism in the perforator 16 from functioning.

In the situation in which the tube V12 is conducting in response to the reception by the measuring system of a correct character, the reset local timing pulse applied to the plate of tube V30 at local fourteen time over the electrical path including lead 27, lead 167 and capacitor 168 causes the multivibrator 179 to return to the initial condition with tube V30 conducting and tube V29 cut off. A negative voltage is applied from the plate of tube V30 to the control grid of tube V31. A negative voltage is also applied from the plate of tube V30 to a diode 176 connected to the cathode of tube V23 over an electrical path including capacitor 177 and lead 178. Multivibrator 134 assumes a condition with tube V23 conducting and tube V24 cut off. A positive voltage is applied to the control grid of tube V26 over the electrical path including lead 156. Tube V26 conducts and the tape advance mechanism in the perforator 16 is operated in the same manner as previously described to advance the tape fed through the perforator 16. At the end of forty milliseconds, the multivibrator 134 is automatically restored to the condition of stable equilibrium with tube V24 cut off and tube V23 conducting. A negative voltage is applied to the control grid of tube V26, and tube V26 is cut off. The tape advance mechanism in the perforator 16 ceases functioning. The operation of the measuring system has, therefore, been undisturbed with the exception that the tape advance mechanism in the perforator 16 has been operated at local fourteen time rather than local thirteen time, due to the necessity of operating the timing punching unit and advancing the tape through the perforator 16 if a correct character is presented to the measuring system at the time the timing arrangement is operated.

It is not necessary that the measuring system be operated in connection with a testing signal forwarded over one of the channels included in the multiplex signal received at terminal 10. In actual practice, the measuring system can be operated in response to the characters included in a regular traffic signal forwarded over one of the channels. The elements of each of the characters received over a selected one of the channels are presented to an utilization circuit by means of terminal 12 or 13 and are simultaneously presented serially in time to the multivibrators 57 through 63 over the leads 50 through 56, respectively. The measuring system can not operate to detect the distorted characters in which the elements have been transposed. This is true because the characters distorted in this manner still include three elements in a marking condition, and are legitimate characters of the seven-unit telegraph protected code. However, because of the coincidence voltage points formed by the left hand tubes of the multivibrators 57 through 63 for the control grid of tubes V8 and V10, the measuring system will operate in the manner described to detect the distorted characters including more than or less than three elements in a marking condition. The counting mechanisms of the registers 29 and 30 operate to count on an individual basis the two types of distorted characters, and the arrangement of elements in the two types of distorted characters are recorded by the operation of perforator 16. The known character register 25 and the transposition register 31 will not be used, and can be disconnected from the measuring system. By making minor modifications in the system as to the operation of the relays and the contacts thereof included in the system to prevent the operation of the perforator 16 in response to the legitimate characters, the measuring system can be operated to detect and record only the distorted characters including more or less than three elements in a marking condition by the operation of registers 29, 30 and the perforator 160.

A measuring system is described that can be adapted for use in measuring the distortion of a signal forwarded over a communication system using a telegraph protected code. The information gathered by the registers 25, 29, 30 and 31 can be studied to determine whether or not the communication system is operating satisfactorily. By studying the arrangement of elements in each distorted character as recorded on a tape by the operation of perforator 16, the tape being marked in time intervals by the operation of the timing punching unit, a basis is provided for determining the reason for the various types of distortion. As a result of the study of the information gathered by the measuring system, changes in design and operation can be made to improve the overall operation of the communication system. Regular testing procedures can be followed to ensure that the communication system is operating properly.

What is claimed is:

1. In a telegraph system including a receiving device adapted to be operated by characters each composed of a predetermined ratio of marking and spacing signal elements, indicating means responsive to the receipt by said device of a character having a ratio smaller than said predetermined ratio of marking and spacing signal elements, and additional indicating means responsive to the receipt by said device of a character having a ratio larger than said predetermined ratio of marking and spacing signal elements.

2. In a telegraph system including a receiving device adapted to be operated by characters each composed of a predetermined ratio of marking and spacing signal elements, indicating means responsive to the receipt by said device of a character having a ratio smaller than said predetermined ratio of marking and spacing signal elements, additional indicating means responsive to the receipt by said device of a character having a ratio larger than said predetermined ratio of marking or spacing signal elements, and further indicating means responsive to the receipt of a character by said device having said predetermined ratio of marking and spacing signal elements but wherein certain ones of the marking and spacing signal elements are transposed.

3. In a telegraph system including a receiving device adapted to be operated by characters each composed of predetermined ratio of marking and spacing signal elements, indicating means responsive to the receipt by said device of a character having a ratio smaller than said predetermined ratio of marking and spacing signal elements, additional indicating means responsive to the receipt by said device of a character having a ratio larger than said predetermined ratio of marking and spacing signal elements, and further indicating means responsive to the receipt of a character by said device having said predetermined ratio of marking and spacing signal elements in the absence of a transposition of the marking and spacing signal elements therein.

4. In a telegraph system including a receiving device adapted to be operated by characters each composed of a predetermined ratio of marking and spacing signal elements, indicating means responsive to the receipt by said device of a character having a ratio smaller than said predetermined ratio of marking and spacing signal elements, additional indicating means responsive to the receipt by said device of a character having a ratio larger than said predetermined ratio of marking and spacing signal elements, further indicating means responsive to the receipt of a character by said device having said predetermined ratio of marking and spacing signal elements but wherein certain ones of the marking and spacing signal elements are transposed, and still further indicating means responsive to the receipt of a character by said device having said predetermined ratio of marking and spacing signal elements in the absence of a transposition of the marking and spacing elements therein.

5. In a telegraph system including a receiving device adapted to be operated by characters each composed of a predetermined ratio of marking and spacing signal elements, indicating means responsive to the receipt by said device of a character having a ratio smaller than said predetermined ratio of marking and spacing signal elements, additional indicating means responsive to the receipt by said device of a character having a ratio larger than said predetermined ratio of marking and spacing signal elements, and a tape perforator responsive to the characters received by said device having a ratio of marking and spacing signal elements larger or smaller than said predetermined ratio.

6. In a telegraph system including a receiving device adapted to be operated by characters each composed of a predetermined ratio of marking and spacing signal elements, indicating means responsive to the receipt by said device of a character having a ratio smaller than said predetermined ratio of marking and spacing signal elements, additional indicating means responsive to the receipt by said device of a character having a ratio larger than said predetermined ratio of marking and spacing signal elements, further indicating means responsive to the receipt of a character by said device having said predetermined ratio of marking and spacing signal elements but wherein certain ones of the marking and spacing signal elements are transposed, and a tape perforator responsive to the characters received by said device having a ratio of marking and spacing signal elements other than said predetermined ratio and to the characters received by said device having said predetermined ratio of marking and spacing signal elements but wherein the marking and spacing signal elements are transposed, but not responsive to the receipt of a proper character corresponding to that transmitted from a remotely located transmitter.

7. A circuit arrangement for measuring the distortion of a signal received over the transmission path of a telegraph communication system, said signal consisting of coded characters including the same number of elements, comprising a signal receiving unit, said receiving unit producing a first voltage in response to characters having a predetermined ratio of elements of one nature to elements of another nature, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, a less-than register, a more-than register, means responsive to said third voltage for enabling said less-than register and blocking the operation of said more-than register, means responsive to said second voltage for enabling said more-than register and blocking the operation of said less-than register, and means responsive to said first voltage for blocking the operation of both of said registers.

8. A circuit arrangement for measuring the distortion of a signal received over the transmission path of a telegraph communication system, said signal consisting of coded characters including the same number of elements, comprising a signal receiving unit, a recording device, said receiving unit producing a first voltage in response to characters having a predetermined ratio of elements of one nature to elements of another nature, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, a less-than register, a more-than register, means responsive to said third voltage for enabling said less-than register and blocking the operation of said more-than register, means responsive to said second voltage for enabling said more-than register and blocking the operation of said less-than register, means responsive to said first voltage for blocking the operation of both of said registers, and means for operating said device in response to the characters wherein the ratio of elements of one nature to elements of another nature is other than said predetermined ratio to record the arrangement of elements therein.

9. A circuit arrangement for measuring the distortion of a signal received over the transmission path of a telegraph communication system, said signal consisting of coded characters including the same number of elements, comprising a signal receiving unit, a recording device of the type which records the intelligence presented thereto on a permanent record and in which said record is advanced therethrough following each operation of said device, said receiving unit producing a first voltage in response to characters having a predetermined ratio of elements of one nature to elements of another nature, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, a less-than register, a more-than register, means responsive to said third voltage for enabling said less-than register and blocking the operation of said more-than register, means responsive to said second voltage for enabling said more-than register and blocking the operation of said less-than register, means responsive to said first voltage for blocking the operation of both of said registers, and means for operating said device in response to the characters wherein the ratio of elements of one nature to elements of another nature is other than said predetermined ratio to record on said record the arrangement of elements therein.

10. A circuit arrangement for measuring the distortion of a signal received over the transmission path of a telegraph communication system as claimed in claim 9, said recording device including a marking mechanism, a timing device arranged to produce a control signal at predetermined intervals, means responsive to said control signal to cause said mechanism to place an indication on said record.

11. A circuit arrangement for measuring the distortion of a signal received over the transmission path of a telegraph communication system, said signal consisting of coded characters including the same number of elements, comprising a signal receiving unit, a tape perforator including a mechanism for advancing a tape therethrough following each operation of said perforator, said receiving unit producing a first voltage in response to characters having a predetermined ratio of elements of one nature to elements of another nature, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, a less-than register, a more-than register, means responsive to said third voltage for enabling said less-than register and blocking the operation of said more-than register, means responsive to said second voltage for enabling said more-than register and blocking the operation of said less-than register, means responsive to said first voltage for blocking the operation of both of said registers, means for operating said perforator in response to the characters wherein the ratio of elements of one nature to elements of another nature is other than said predetermined ratio to record the arrangement of elements therein, and a timing device arranged to produce a control signal at predetermined intervals, said perforator including a mechanism responsive to said control signal to place an indication on said tape.

12. A circuit arrangement for measuring the distortion of a signal received over the transmission path of a telegraph communication system as claimed in claim 11, said perforator being arranged to record said elements of one nature as holes punched in said tape and said elements of another nature as no holes.

13. A circuit arrangement for measuring the distortion of a signal received over the transmission path of a telegraph communication system, said signal consisting of coded characters each including seven elements, comprising a signal receiving unit, said receiving unit producing a first voltage in response to characters having a predetermined ratio of three marking elements to four spacing elements, said receiving unit producing a second voltage in response to characters wherein the ratio of marking elements to spacing elements is larger than said predetermined ratio, said receiving unit producing a third voltage in response to characters wherein the ratio of marking elements to spacing elements is smaller than said predetermined ratio, a less-than register, a more-than register, means responsive to said third voltage for enabling said less-than register and blocking the operation of said more-than register, means responsive to said second voltage for enabling said more-than register and blocking the operation of said less-than register, and means responsive to said first voltage for blocking the operation of both of said registers.

14. A circuit arrangement for measuring the distortion of a signal received over the transmission path of a telegraph communication system, said signal consisting of a repeated coded character including a given number of elements, comprising a signal receiving unit, said receiving unit producing a first voltage in response to characters having a predetermined ratio of elements of one nature to elements of another nature arranged in a proper order, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, a less-than register, a more-than register, a known character register, means responsive to said third voltage for enabling said less-than register and blocking the operation of said more-than and known character registers, means responsive to said second voltage for enabling said more-than register and blocking the operation of said less-than and known character registers, and means responsive to said first voltage for enabling said known character register and blocking the operation of said less-than and more-than registers.

15. A circuit arrangement for measuring the distortion of a signal received over the transmission path of a telegraph communication system, said signal consisting of a repeated coded character including a given number of elements, comprising a signal receiving unit, a recording device of the type which records intelligence presented thereto on a permanent record and in which said record is advanced therethrough following each operation of said device, said receiving unit producing a first voltage in response to characters having a predetermined ratio of elements of one nature to elements of another nature arranged in a proper order, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, a less-than register, a more-than register, a known character register, means responsive to said third voltage for enabling said less-than register and blocking the operation of said more-than and known character registers, means responsive to said second voltage for enabling said more-than register and blocking the operation of said less-than and known character registers, means responsive to said first voltage for enabling said known character register and blocking the operation of said less-than and more-than registers, and means for operating said device in response to the characters wherein the ratio of elements of one nature to elements of another nature is other than said predetermined ratio to record on said record the arrangement of elements therein.

16. A circuit arrangement for measuring the distortion of a signal received over the transmission path of a telegraph communication system as claimed in claim 15, said recording device including a marking mechanism, a timing device arranged to produce a control signal at predetermined intervals, means responsive to said control signal to cause said mechanism to place an indication on said record.

17. A circuit arrangement for measuring the distortion of a signal received over the transmission path of a telegraph communication system, said signal consisting of a repeated coded character including a given number of elements, comprising a signal receiving unit, a tape perforator including a mechanism for advancing a tape therethrough following each operation of said perforator, said receiving unit producing a first voltage in response to characters having a predetermined ratio of elements of one nature to elements of another nature arranged in a proper order, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, a less-than register, a more-than register, a known character register, means responsive to said third voltage for enabling said less-than register and blocking the operation of said more-than and known character registers, means responsive to said second voltage for enabling said more-than register and blocking the operation of said less-than and known character registers, means responsive to said first voltage enabling said known character register and blocking the operation of said less-than and more-than registers, means for operating said perforator in response to the characters wherein the ratio of elements of one nature to elements of another nature is other than said predetermined ratio to record the arrangement of elements therein, and a timing device arranged to produce a control signal at predetermined intervals, said perforator including a mechanism responsive to said control signal to place an indication on said tape.

18. A circuit arrangement for measuring the distortion of a signal received over the transmission path of a telegraph communication system, said signal consisting of a repeated coded character including seven elements, comprising a signal receiving unit, a tape perforator including a mechanism for advancing a tape therethrough following each operation of said perforator, said receiving unit producing a first voltage in response to characters having a predetermined ratio of three marking elements to four spacing elements arranged in a proper order, said receiving unit producing a second voltage in response to characters wherein the ratio of marking elements to spacing elements is larger than said predetermined ratio, said receiving unit producing a third voltage in response to characters wherein the ratio of marking elements to spacing elements is smaller than said predetermined ratio, a less-than register, a more-than register, a known character register, means responsive to said third voltage for enabling said less-than register and blocking the operation of said more-than and known character registers, means responsive to said second voltage for enabling said more-than register and blocking the operation of said less-than and known character registers, means responsive to said first voltage enabling said known character register and blocking the operation of said less-than and more-than registers, means for operating said perforator in response to the characters wherein the ratio of marking elements to spacing elements is other than said predetermined ratio to record the arrangement of elements therein, and a timing device arranged to produce a control signal at predetermined intervals, said perforator including a mechanism responsive to said control signal to place an indication on said tape.

19. A circuit arrangement for measuring the distortion of a signal received over the transmission path of a telegraph communication system, said signal consisting of a repeated coded character including a given number of elements, comprising a signal receiving unit, said receiving unit producing a first voltage in response to signal characters having a predetermined ratio of elements of one nature to elements of another nature arranged in a proper order, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, said receiving unit producing a fourth voltage in response to characters having said predetermined ratio of elements of one nature to elements of another nature but wherein the elements are arranged in an order other than said proper order, a less-than register, a more-than register, a transposition register, means responsive to said fourth voltage for enabling said transposition register and blocking the operation of said less-than and more-than registers, means responsive to said third voltage for enabling said less-than register and blocking the operation of said more-than and transposition registers, means responsive to said second voltage for enabling said more-than register and blocking the operation of said less-than and transposition registers, and means responsive to said first voltage for blocking the operation of said less-than, more-than and transposition registers 20. A circuit arrangement for measuring the distortion of a signal received over the transmission path of a telegraph communication system, said signal consisting of a repeated coded character including a given number of elements, comprising a signal receiving unit, a tape perforator including a mechanism for advancing a tape therethrough following each operation of said perforator, said receiving unit producing a first voltage in response to characters having a predetermined ratio of elements of one nature to elements of another nature arranged in a proper order, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, said receiving unit producing a fourth voltage in response to characters having said predetermined ratio of elements of one nature to elements of another nature but wherein the elements are arranged in an order other than said proper order, a less-than register, a more-than register, a transposition register, means responsive to said fourth voltage for enabling said transposition register and blocking the operation of said more-than and less-than registers, means responsive to said third voltage for enabling said less-than register and blocking the operation of said more-than and transposition registers, means responsive to said second voltage enabling said more-than register and blocking the operation of said less-than and transposition registers, means responsive to said first voltage for blocking the operation of said less-than, more-than and transposition registers, means for operating said perforator in response to the characters wherein the elements are arranged in an order other than said proper order and wherein the ratio of elements of one nature to elements of another nature is other than said predetermined ratio to record the arrangement of elements therein, and a timing device arranged to produce a control signal at predetermined intervals, said perforator including a mechanism responsive to said control signal to place an indication on said tape.

21. A circuit arrangement for measuring the distortion of a signal received over the transmission path of a telegraph communication system, said signal consisting of a repeated coded character including a given number of elements, comprising a signal receiving unit, said receiving unit producing a first voltage in response to characters having a predetermined ratio of elements of one nature to elements of another nature arranged in a proper order, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, said receiving unit producing a fourth voltage in response to characters having said predetermined ratio of elements of one nature to elements of another nature but wherein the elements are arranged in an order other than said proper order, a less-than register, a more-than register, a transposition register, a known character register, means responsive to said fourth voltage for enabling said transposition register and blocking the operation of said more-than, less-than and known character registers, means responsive to said third voltage for enabling said less-than register and blocking the operation of said more-than, transposition and known character registers, means responsive to said second voltage enabling said more-than register and blocking the operation of said less-than, transposition and known character registers, and means responsive to said first voltage for enabling said known character register and blocking the operation of said less-than, more-than and transposition registers.

22. A circuit arrangement for measuring the distortion of a signal received over the transmission path of a telegraph communication system, said signal consisting of a repeated coded character including a given number of elements, comprising a signal receiving unit, a recording device of the type which records intelligence presented thereto on a permanent record and in which said record is advanced therethrough following each operation of said device, said receiving unit producing a first voltage in response to characters having a predetermined ratio of elements of one nature to elements of another nature arranged in a proper order, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, said receiving unit producing a fourth voltage in response to characters having said predetermined ratio of elements of one nature to elements of another nature but wherein the elements are arranged in an order other than said proper order, a less-than register, a more-than register, a transposition register, a known character register, means responsive to said fourth voltage for enabling said transposition register and blocking the operation of said less-than, more-than and known character registers, means responsive to said third voltage for enabling said less-than register and blocking the operation of said more-than, transposition and known character registers, means responsive to said second voltage enabling said more-than register and blocking the operation of said less-than, transposition and known character registers, means responsive to said first voltage for enabling said known character register and blocking the operation of said less-than, more-than and transposition registers, means for operating said device in response to the characters wherein the elements are arranged in an order other than said proper order and wherein the ratio of elements of one nature to elements of another nature is other than said predetermined ratio to record on said record the arrangement of elements therein.

23. A circuit arrangement for measuring the distortion of a signal received over the transmission path of a telegraph communication system as claimed in claim 22, said recording device including a marking mechanism, a timing device arranged to produce a control signal at predetermined intervals, means responsive to said control signal to cause said mechanism to place an indication on said record.

24. A circuit arrangement for measuring the distortion of a signal received over the transmission path of a telegraph communication system, said signal consisting of a repeated coded character including a given number of elements, comprising a signal receiving unit, a tape perforator including a mechanism for advancing a tape therethrough following each operation of said perforator, said receiving unit producing a first voltage in response to characters having a predetermined ratio of elements of one nature to elements of another nature arranged in a proper order, said receiving unit producing a second voltage in response to characters wherein the ratio of elements of one nature to elements of another nature is larger than said predetermined ratio, said receiving unit producing a third voltage in response to characters wherein the ratio of elements of one nature to elements of another nature is smaller than said predetermined ratio, said receiving unit producing a fourth voltage in response to characters having said predetermined ratio of elements of one nature to elements of another nature but wherein the elements are arranged in an order other than said proper order, a less-than register, a more-than register, a transposition register, a known character register, means responsive to said fourth voltage for enabling said transposition register and blocking the operation of said less-than, more-than and known character registers, means responsive to said third voltage for enabling said less-than register and blocking the operation of said more-than, transposition and known character registers, means responsive to said second voltage enabling said more-than register and blocking the operation of said less-than, transposition and known character registers, means responsive to said first voltage for enabling said known character register and blocking the operation of said less-than, more-than and transposition registers, means for operating said perforator in response to the characters wherein the elements are arranged in an order other than said proper order and wherein the ratio of elements of one nature to elements of another nature is other than said predetermined ratio to record the arrangement of elements therein, and a timing device arranged to produce a control signal at predetermined intervals, said perforator including a mechanism responisve to said control signal to place an indication on said tape.

25. A circuit arrangement for measuring the distortion of a signal received over the transmission path of a telegraph communication system as claimed in claim 24, said perforator being arranged to record the elements of one nature as holes punched in said tape and the elements of another nature as no holes.

26. A circuit arrangement for measuring the distortion of a signal received over the transmission path of a telegraph communication system, said signal consisting of a repeated coded character including seven elements, comprising a signal receiving unit, a tape perforator including a mechanism for advancing a tape therethrough following each operation of said perforator, said receiving unit producing a first voltage in response to characters having a predetermined ratio of three marking elements to four spacing elements arranged in a proper order, said receiving unit producing a second voltage in response to characters wherein the ratio of marking elements to spacing elements is larger than said predetermined ratio, said receiving unit producing a third voltage in response to characters wherein the ratio of marking elements to spacing elements is smaller than said predetermined ratio, said receiving unit producing a fourth voltage in response to characters having said predetermined ratio of marking elements to spacing elements but wherein the elements are arranged in an order other than said proper order, a less-than register, a more-than register, a transposition register, a known character register, means responsive to said fourth voltage for enabling said transportation register and blocking the operation of said less-than, more-than and known character registers, means responsive to said third voltage for enabling said less-than register and blocking the operation of said more-than, transposition and known character registers, means responsive to said second voltage for enabling said more-than register and blocking the operation of said less-than, transposition and known character registers, means responsive to said first voltage for enabling said known character register and blocking the operation of said less-than, more-than and transposition registers, means for operating said perforator in response to the characters wherein the elements are arranged in an order other than said proper order and wherein the ratio of marking elements to spacing elements is other than said predetermined ratio to record the arrangement of elements therein, and a timing device arranged to produce a control signal at predetermined intervals, said perforator including a mechanism responsive to said control signal to place an indication on said tape.

27. A circuit arrangement for measuring the distortion of a signal received over the transmission path of a telegraph communication system as claimed in claim 26, wherein said receiving unit includes a plurality of multivibrators for producing said first, second, third and fourth voltages.

28. In a telegraph system including a receiving device adapted to be operated in response to characters each composed of a predetermined ratio of elements of one nature to elements of another nature, indicating means responsive only to the receipt by said device of each of said characters having a ratio smaller than said predetermined ratio of said elements of one nature to said elements of another nature, and additional indicating means responsive only to the receipt by said device of each of said characters having a ratio larger than said predetermined ratio of said elements of one nature to said elements of another nature.

29. In a telegraph system including a receiving device adapted to be operated in response to characters each composed of a predetermined ratio of elements of one nature to elements of another nature, a first indicating means responsive only to the receipt by said device of each of said characters having a ratio smaller than said predetermined ratio of said elements of one nature to said elements of another nature, a second indicating means responsive only to the receipt by said device of each of said characters having a ratio larger than said predetermined ratio of said elements of one nature to said elements of another nature, and recording means connected to said device and responsive to the receipt by said device of said characters having a ratio of said elements of one nature to said elements of another nature other than said predetermined ratio to provide a permanent record of the makeup of each of said last-mentioned characters.

References Cited in the file of this patent

UNITED STATES PATENTS

| | | |
|---|---|---|
| 2,675,538 | Malthaner et al. | Apr. 13, 1954 |
| 2,675,539 | McGuigan | Apr. 13, 1954 |
| 2,680,240 | Greenfield | June 1, 1954 |